(12) United States Patent
Palese

(10) Patent No.: US 12,710,586 B2
(45) Date of Patent: Aug. 18, 2026

(54) PHOTONIC INTEGRATED CIRCUIT TEMPORAL AND FREQUENCY DISPERSION SQUINT CORRECTION FOR OPTICAL PHASED ARRAY

(71) Applicant: Raytheon Company, Waltham, MA (US)

(72) Inventor: Stephen P. Palese, Redondo Beach, CA (US)

(73) Assignee: Raytheon Company, Arlington, VA (US)

( * ) Notice: Subject to any disclaimer, the term of this patent is extended or adjusted under 35 U.S.C. 154(b) by 41 days.

(21) Appl. No.: 17/809,073

(22) Filed: Jun. 27, 2022

(65) Prior Publication Data

US 2023/0417985 A1 Dec. 28, 2023

(51) Int. Cl.
*G02B 6/12* (2006.01)

(52) U.S. Cl.
CPC ..... *G02B 6/12016* (2013.01); *G02B 6/12004* (2013.01); *G02B 6/12014* (2013.01); *G02B 2006/12102* (2013.01)

(58) Field of Classification Search
None
See application file for complete search history.

(56) References Cited

U.S. PATENT DOCUMENTS 3,975,628 A 8/1976 Graves et al.
4,867,518 A * 9/1989 Stamnitz ............ G02B 6/29332 359/341.2

(Continued)

FOREIGN PATENT DOCUMENTS

CN 110572210 A 12/2019
CN 113608228 A 11/2021

(Continued)

OTHER PUBLICATIONS

Palese et al., "Photonic Integrated Circuit With Independent Unit Cells Having Multi-Polarization Sensitivity" U.S. Appl. No. 17/654,200, filed Mar. 9, 2022, 44 pages.

(Continued)

*Primary Examiner* — Chris H Chu

(57) ABSTRACT

An apparatus includes a photonic integrated circuit having an optical phased array and multiple arms. The optical phased array includes multiple unit cells, and each unit cell includes an antenna element configured to transmit or receive optical signals. The multiple arms are configured to modify the optical signals transmitted or received by the optical phased array. Each arm is controllable to provide at least one of temporal squint correction and frequency dispersion squint correction. The photonic integrated circuit may include electro-optic modulators, and the electro-optic modulators may be configured to provide controllable delays to the optical signals transmitted or received by the optical phased array. The photonic integrated circuit may include dispersive compensation elements, and the dispersive compensation elements may be configured to use controllable phase-frequency relationships to adjust the optical signals transmitted or received by the optical phased array in order to provide frequency dispersion squint correction.

20 Claims, 9 Drawing Sheets

(56) References Cited

U.S. PATENT DOCUMENTS 5,852,687 A * 12/1998 Wickham ............ G02B 6/2861 385/16
6,775,007 B2 * 8/2004 Izatt .................... G01B 9/0201 356/497
7,408,507 B1 8/2008 Paek et al.
7,729,572 B1 6/2010 Pepper et al.
7,949,030 B2 5/2011 Volodin
8,068,235 B1 11/2011 Marron et al.
9,515,390 B1 12/2016 Feng et al.
9,525,489 B2 12/2016 Schuetz et al.
10,224,628 B2 3/2019 Vidal Drummond et al.
10,634,973 B2 4/2020 Hashemi et al.
10,656,496 B2 5/2020 Hashemi et al.
10,838,222 B2 11/2020 Khachaturian et al.
11,029,465 B1 6/2021 Rakowski et al.
11,855,692 B2 12/2023 Murakowski et al.
11,886,095 B2 1/2024 Brough et al.
2004/0037500 A1 * 2/2004 Yoo ....................... H04J 14/005 385/31
2004/0101317 A1 * 5/2004 Yap ....................... H01S 5/4006 398/187
2006/0239312 A1 10/2006 Kewitsch et al.
2015/0293224 A1 10/2015 Eldada et al.
2016/0094016 A1 3/2016 Beach et al.
2017/0170556 A1 * 6/2017 Carey ................. H01Q 3/2611
2017/0234984 A1 * 8/2017 Khial .................. G01S 7/4817 356/5.1
2017/0324162 A1 11/2017 Khachaturian et al.
2018/0039154 A1 * 2/2018 Hashemi .............. G02F 1/2955
2018/0107091 A1 4/2018 Hosseini et al.
2019/0004151 A1 1/2019 Abediasl et al.
2019/0227351 A1 7/2019 Behroozpour et al.
2019/0267708 A1 * 8/2019 Tennant ............... H04B 10/505
2019/0339389 A1 11/2019 Russo et al.
2020/0049886 A1 2/2020 Chriqui et al.
2020/0192179 A1 6/2020 Hajimiri
2020/0217961 A1 7/2020 Russo et al.
2020/0284883 A1 9/2020 Ferreira et al.
2020/0284910 A1 9/2020 Yaacobi et al.
2021/0149227 A1 5/2021 Lee et al.
2021/0210455 A1 7/2021 Getty et al.
2021/0278707 A1 9/2021 Moss et al.
2021/0381964 A1 * 12/2021 Puppe .................. H01S 3/1307
2022/0063031 A1 * 3/2022 Ho ....................... H01S 5/0237
2022/0075186 A1 3/2022 Watts et al.
2022/0128666 A1 4/2022 Schrans et al.
2022/0224413 A1 7/2022 Shamee
2022/0229343 A1 7/2022 Kendrick et al.
2022/0244578 A1 8/2022 Palese et al.
2022/0252786 A1 8/2022 Yengst et al.
2022/0252908 A1 8/2022 Inamdar et al.
2022/0255219 A1 8/2022 Kendrick et al.
2022/0255221 A1 8/2022 Palese et al.
2023/0012303 A1 * 1/2023 Dhori ................... G11C 11/412

FOREIGN PATENT DOCUMENTS

EP 3761528 A1 1/2021
WO 2022067268 A2 3/2022
WO 2023201128 A1 10/2023

OTHER PUBLICATIONS

Palese et al., "Photonic Integrated Circuit-Based Polarization-Independent Optical Devices" U.S. Appl. No. 17/659,789, filed Apr. 19, 2022, 44 pages.

Palese et al., "Photonic Integrated Circuit Multi-Wavelength Phase Modulator Networks" U.S. Appl. No. 17/806,873, filed Jun. 14, 2022, 53 pages.

Palese et al., "Photonic Integrated Circuit-Based Optical Communication Optimized For Receive Aperture Amplitude And Phase Modulations" U.S. Appl. No. 17/734,887, filed May 2, 2022, 48 pages.

Palese et al., "Photonic Integrated Circuit With Inverted H-Tree Unit Cell Design" U.S. Appl. No. 17/809,608, filed Jun. 29, 2022, 48 pages.

Palese, "Photonic Integrated Circuit Temporal And Frequency Dispersion Squint Correction For Optical Phased Array" U.S. Appl. No. 17/809,073, filed Jun. 27, 2022, 51 pages.

Palese, "Photonic Integrated Circuit-Based Transmissive/Reflective Wavefront Optical Phase Control" U.S. Appl. No. 17/662,797, filed May 10, 2022, 43 pages.

Kendrick et al., "Photonic Integrated Circuit-Based Imaging Systems" U.S. Appl. No. 17/654,204, filed Mar. 9, 2022, 35 pages.

International Search Report and Written Opinion of the International Searching Authority dated Feb. 24, 2022 in connection with International Patent Application No. PCT/US2021/059421, 16 pages.

International Search Report and Written Opinion of the International Searching Authority dated Apr. 8, 2022 in connection with International Patent Application No. PCT/US2021/064527, 10 pages.

Office Action dated Apr. 13, 2022 in connection with U.S. Appl. No. 17/174,132, 20 pages.

Blumenthal, "Silicon Nitride in Silicon Photonics," Proceedings of the IEEE, vol. 106, No. 12, Dec. 2018, 23 pages.

He et al., "Review of Photonic Integrated Optical Phased Arrays for Space Optical Communication," IEEE Access, vol. 3, Oct. 2020, 16 pages.

Creedon et al., "High efficiency coherent beam combining of semiconductor optical amplifiers," Optics Letters, vol. 37, No. 23, Dec. 2012, 3 pages.

Fatemi et al., "A Nonuniform Sparse 2-D Large-FOV Optical Phased Array With a Low-Power PWM Drive," IEEE Journal of Solid-State Circuits, vol. 54, Issue 5, May 2019, 16 pages.

Heidel et al., "A Review of Electronic-Photonic Heterogeneous Integration at Darpa," IEEE Journal of Selected Topics in Quantum Electronics, vol. 22, No. 6, Nov. 2016, 9 pages.

Kim et al., "A Single-Chip Optical Phased Array in a Wafer-Scale Silicon Photonics / CMOS 3D-Integration Platform," IEEE Journal of Solid-State Circuits, vol. 54, Issue 11, Nov. 2019, 14 pages.

Komljenovic et al., "On-chip calibration and control of optical phased arrays," Optics Express, vol. 26, No. 3, Jan. 2018, 12 pages.

Larocque et al., "Beam steering with ultracompact and low-power silicon resonator phase shifters," Optics Express, vol. 27, No. 24, Nov. 2019, 16 pages.

Li et al., "Fast Optical Phased Array Calibration Technique for Random Phase Modulation LiDAR," IEEE Photonics Journal, vol. 11, No. 1, Feb. 2019, 10 pages.

Marron et al., "Atmospheric turbulence correction using digital holographic detection: experimental results," Optics Express, vol. 17, No. 14, Jul. 2009, 14 pages.

Marron et al., "Extended-range digital holographic imaging," Proc. of SPIE, vol. 7684 76841J, 2010, 6 pages.

Mehta et al., "An Optically Sampled ADC in 3D Integrated Silicon-Photonics/65nm Cmos," IEEE 2020 Symposium on VLSI Technology Digest of Technical Papers—THL.3, 2020, 2 pages.

Orcutt et al., "Open foundry platform for high-performance electronic-photonic integration," Optics Express, vol. 20, No. 11, May 2012, 11 pages.

Sayyah et al., "Two-dimensional pseudo-random optical phased array based on tandem optical injection locking of vertical cavity surface emitting lasers," Optics Express, vol. 23, No. 15, Jul. 2015, 12 pages.

Zhang et al., "Phase Calibration of On-Chip Optical Phased Arrays via Interference Technique," IEEE Photonics Journal, vol. 12, No. 2, Apr. 2020, 11 pages.

Kendrick et al., "Photonic Integrated Circuit Distance Measuring Interferometer," U.S. Appl. No. 16/929,907, filed Jul. 15, 2020, 35 pages.

Palese et al., "Photonic Integrated Circuit-Based Communication Transmit/Receive System," U.S. Appl. No. 17/174,132, filed Feb. 11, 2021, 61 pages.

Palese et al., "Photonic Integrated Circuit-Based Coherently Phased Array Laser Transmitter," U.S. Appl. No. 17/162,860, filed Jan. 29, 2021, 35 pages.

(56) References Cited

OTHER PUBLICATIONS

Kendrick et al., "Photonic Integrated Circuit-Based Optical Phased Array Phasing Technique," U.S. Appl. No. 17/174,180, filed Feb. 11, 2021, 60 pages.
Inamdar et al., "Photonic Integrated Circuit-Based Optical Phased Array Calibration Technique," U.S. Appl. No. 17/174,197, filed Feb. 11, 2021, 61 pages.
Abediasl et al., "Monolithic optical phased-array transceiver in a standard Soi Cmos process", Optics Express, vol. 23, No. 5, Mar. 2015, 11 pages.
Office Action dated Sep. 16, 2021 in connection with U.S. Appl. No. 17/174,132, 18 pages.
Ristic et al., "An Optical Phase-Locked Loop Photonic Integrated Circuit," Journal of Lightwave Technology, vol. 28, No. 4, Feb. 15, 2010, 13 pages.
Office Action issued Sep. 16, 2024 in connection with U.S. Appl. No. 17/811,565, 15 pages.
Amato et al., "Photonic integrated circuits for ultra-fast steering in phased-array antennas," International Conference on Space Optics—ICSO 2018, Oct. 2018, 9 pages.
Cao et al., "Advanced Integration Techniques on Broadband Millimeter-Wave Beam Steering for 5G Wireless Networks and Beyond," IEEE Journal of Quantum Electronics, vol. 52, issue: 1, Jan. 2015, 21 pages.
International Search Report and Written Opinion of the International Searching Authority dated May 9, 2023, in connection with International Application No. PCT/US2023/061440, 12 pages.

* cited by examiner 600
602
604
606
608
610
610a
610b
610n
612
614
616
618
620
622
624a
624b
626
628a
628b
630a
630b
632a
632b
634
636
638
640
642a
642b
644
646
648
650
652
654
θ: PHASED ARRAY EMISSION ANGLE
AMPLITUDE
TIME
δT
PD

PHOTONIC INTEGRATED CIRCUIT TEMPORAL AND FREQUENCY DISPERSION SQUINT CORRECTION FOR OPTICAL PHASED ARRAY

TECHNICAL FIELD

This disclosure relates generally to optical systems. More specifically, this disclosure relates to photonic integrated circuit (PIC) temporal and frequency dispersion squint correction for an optical phased array (OPA).

BACKGROUND

Next-generation optical phased arrays (OPAs) are being designed for use in free-space optical systems, which refer to systems where optical signals are transmitted and received through free space rather than through optical fibers. These optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals.

SUMMARY

This disclosure relates to photonic integrated circuit (PIC) temporal and frequency dispersion squint correction for an optical phased array (OPA).

In a first embodiment, an apparatus includes a photonic integrated circuit. The photonic integrated circuit includes an optical phased array having multiple unit cells, where each unit cell includes an antenna element configured to transmit or receive optical signals. The photonic integrated circuit also includes multiple arms configured to modify the optical signals transmitted or received by the optical phased array, where each arm is controllable to provide at least one of temporal squint correction and frequency dispersion squint correction.

In a second embodiment, a method includes transmitting or receiving optical signals using a photonic integrated circuit. The photonic integrated circuit includes an optical phased array. The optical phased array includes multiple unit cells, and each unit cell includes an antenna element that transmits or receives optical signals. The method also includes controlling multiple arms of the photonic integrated circuit to modify the optical signals transmitted or received by the optical phased array. Each arm is controllable to provide at least one of temporal squint correction and frequency dispersion squint correction.

In a third embodiment, an apparatus includes a photonic integrated circuit. The photonic integrated circuit includes an optical phased array having multiple unit cells, where each unit cell includes means for transmitting or receiving optical signals. The photonic integrated circuit also includes means for modifying the optical signals transmitted or received by the optical phased array to provide at least one of temporal squint correction and frequency dispersion squint correction.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
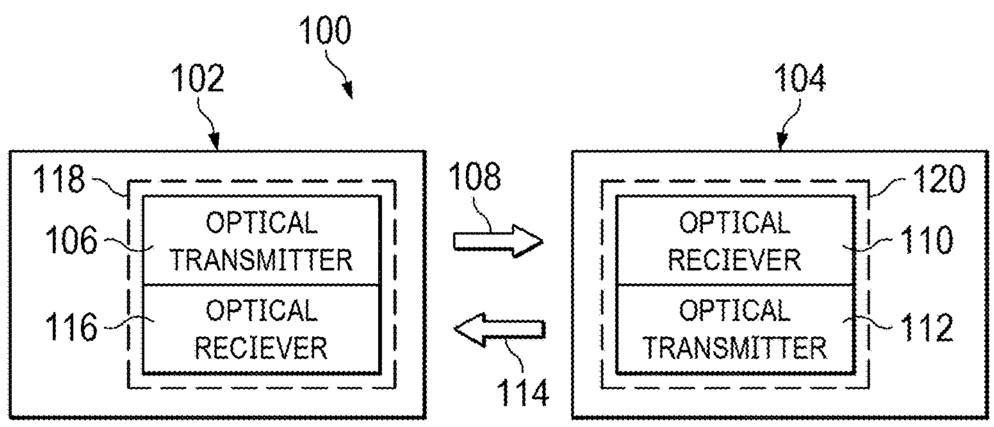
FIG. 1 illustrates an example system supporting photonic integrated circuit (PIC) temporal and frequency dispersion squint correction for an optical phased array (OPA) according to this disclosure.

FIGS. 1 through 11, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, next-generation optical phased arrays (OPAs) are being designed for use in free-space optical systems, which refer to systems where optical signals are transmitted and received through free space rather than through optical fibers. These optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals.

A receiving optical phased array is typically designed so that optimal signal timing is achieved when optical signals are received at a specified angle relative to the receiving optical phased array (such as orthogonal to a plane of the receiving optical phased array). However, optical phased arrays are often used in devices or systems that can move with respect to one another. When optical signals are received at a receiving optical phased array from a transmitting optical phased array that is not positioned at the specified angle relative to the receiving optical phased array, the optical signals may be received by nano-antennas in the receiving optical phased array at slightly different times. This is a problem often referred to as time squint or temporal squint. Moreover, when the optical signals are received from the transmitting optical phased array that is not positioned at the specified angle relative to the receiving optical phased array, differential wavelength diffraction may occur within the receiving optical phased array, which can alter the frequency of the optical signals slightly. This is a problem often referred to as frequency dispersion squint or simply frequency squint. Both temporal squint and frequency squint can interfere with reception of the optical signals, which can reduce the data rate or otherwise negatively impact the use of the optical signals. While it may be possible to provide adjustable time delays within an optical phased array, this can create insertion losses within the receiving device. This approach also becomes problematic (if not impossible) when an optical phased array includes a very large number of nano-antennas.

This disclosure provides photonic integrated circuit temporal and frequency dispersion squint correction for an optical phased array. As described in more detail below, temporal compensation and frequency compensation can be performed within a photonic integrated circuit to provide temporal squint compensation and frequency squint compensation. For example, the photonic integrated circuit may incorporate an array of electro-optic modulators (such as an array incorporating hundreds of electro-optic modulators or more) that can adjust the amplitude or phase of optical signals. The electro-optic modulator array can be used to support temporal-based compensation within the photonic integrated circuit, thereby helping to correct for temporal squint. The photonic integrated circuit may also incorporate an array of dispersive compensation elements (such as an array incorporating hundreds of dispersive compensation elements or more) that can optimize the frequency dispersion of optical signals. In some embodiments, the dispersive compensation elements may be implemented using resonant micro-ring modulators or other types of modulators. The dispersive compensation element array can be used to support frequency-based compensation within the photonic integrated circuit, thereby helping to correct for frequency squint.

In this way, the electro-optic modulators and the dispersive compensation elements can be used to reduce or eliminate the effects of temporal squint and frequency squint. As a result, the photonic integrated circuit can be used to enable more effective optical communications or other uses of optical signals, even if transmitting and receiving optical devices move with respect to one another or otherwise depart from an ideal transmit/receive angle. Also, in some cases, temporal compensation and frequency compensation can be performed with sufficient spatial resolution so as to not affect (at least to a significant extent) the data rate of optical communications as the transmit/receive angle changes between transmitting and receiving optical devices. Further, in some cases, the photonic integrated circuit may perform step-wise temporal compensation and step-wise frequency compensation (such as by using steps based on the transmit/receive angle), which can result in significant simplification of the overall compensation. In addition, in some cases, on-PIC phase locking of temporally-shifted optical signals can used, which can help to simplify implementation and improve accuracy.

Note that in the following discussion, it is often assumed that photonic integrated circuits use electro-optic modulators and dispersive compensation elements to reduce or eliminate the effects of both temporal squint and frequency squint. However, other embodiments of the photonic integrated circuits may use electro-optic modulators to reduce or eliminate the effects of temporal squint or may use dispersive compensation elements to reduce or eliminate the effects of frequency squint (but not both).

FIG. 1 illustrates an example system 100 supporting PIC temporal and frequency dispersion squint correction for an optical phased array according to this disclosure. As shown in FIG. 1, the system 100 includes two nodes 102 and 104 that communicate with one another optically. Each node 102 and 104 represents a ground-, air-, or space-based system that can transmit or receive data using optical communications. In this example, the nodes 102 and 104 can engage in bidirectional communication with one another. However, this is not necessarily required, and the nodes 102 and 104 may engage in unidirectional communication with one another (meaning one node 102 or 104 may only transmit and the other node 104 or 102 may only receive, at least with respect to each other).

The node 102 in this example includes an optical transmitter 106, which generally operates to produce optical signals 108 used for communication or other purposes. For example, the optical transmitter 106 may encode information onto the optical signals 108, such as by using suitable amplitude, phase, frequency, or other modulation(s) of light. The optical signals 108 can be transmitted through free space or other transmission medium to the node 104, where an optical receiver 110 receives and processes the optical signals 108. For instance, the optical receiver 110 can identify the amplitude, phase, frequency, or other modulation(s) of light in the optical signals 108 and use the identified modulation(s) to recover the information encoded onto the optical signals 108. Any suitable type of modulation/demodulation scheme may be used here to encode and decode the optical signals 108 (assuming communication is one purpose of the optical signals 108). Since the nodes 102 and 104 are bidirectional in this example, the same process can be used in the opposite direction, meaning an optical transmitter 112 of the node 104 produces optical signals 114 that are transmitted towards the node 102 and received and processed by an optical receiver 116 of the node 102.

Note that while the optical transmitter 106 and the optical receiver 116 are shown here as separate components, they can be integrated into a single optical transceiver 118. This may allow, for example, the same PIC-based structure to be used for both transmission and reception purposes. Similarly, while the optical transmitter 112 and the optical receiver 110 are shown here as separate components, they can be integrated into a single optical transceiver 120. This may allow, for instance, the same PIC-based structure to be used for both transmission and reception purposes.

As described in more detail below, each optical transmitter 106 and 112, optical receiver 110 and 116, or optical transceiver 118 and 120 includes at least one PIC-based optical phased array, which is used to transmit or receive the optical signals 108 and 114. Each optical phased array in at least the optical transmitters 106 and 112 or the optical transceivers 118 and 120 can be implemented using a photonic integrated circuit that is configured to reduce or eliminate temporal squint and frequency squint as described below.

The optical transmitters, receivers, and transceivers described in this disclosure may find use in a large number of applications. For example, optical transmitters, receivers, or transceivers may be used in data centers or telecommunication systems to transport information rapidly between locations, including the transport of large amounts of information over very lame distances. Optical transmitters, receivers, or transceivers may be used in consumer or commercial electronic devices, biomedical devices, or advanced computing devices to support optical-based communications with those devices. Optical transmitters, receivers, or transceivers may be used in airplanes, drones, satellites, autonomous vehicles, rockets, missiles, or other commercial or defense-related systems. Optical transmitters, receivers, or transceivers may be used in non-communication-related optical applications, such as laser detection and ranging (LADAR) applications or other applications that can use polarimetric processing with PIC-based optical phased arrays. In general, this disclosure is not limited to any particular application of the optical transmitters, receivers, and transceivers.

Although FIG. 1 illustrates one example of a system 100 supporting PIC temporal and frequency dispersion squint correction for an optical phased array, various changes may be made to FIG. 1. For example, while only two nodes 102 and 104 are shown here, the system 100 may include any suitable number of nodes that engage in any suitable unidirectional, bidirectional, or other communications or other interactions with each other. Also, each node of the system 100 may include any suitable number of optical transmitters, receivers, or transceivers that communicate or otherwise use any number of optical signals. In addition, the system 100 is shown in simplified form here and may include any number of additional components in any suitable configuration as needed or desired.

Figure 2A:
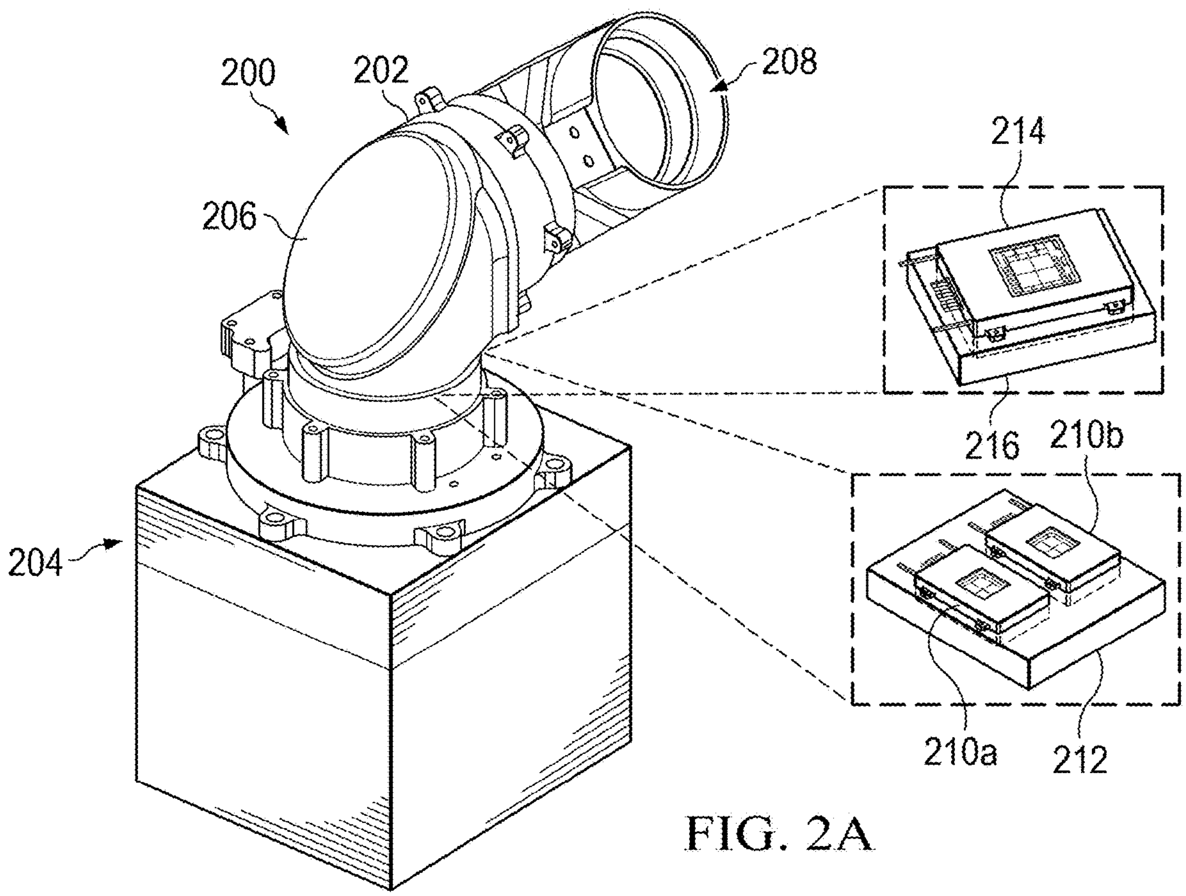
FIGS. 2A and 2B illustrate an example device supporting PIC temporal and frequency dispersion squint correction for an optical phased array and associated details according to this disclosure.
Figure 2B:
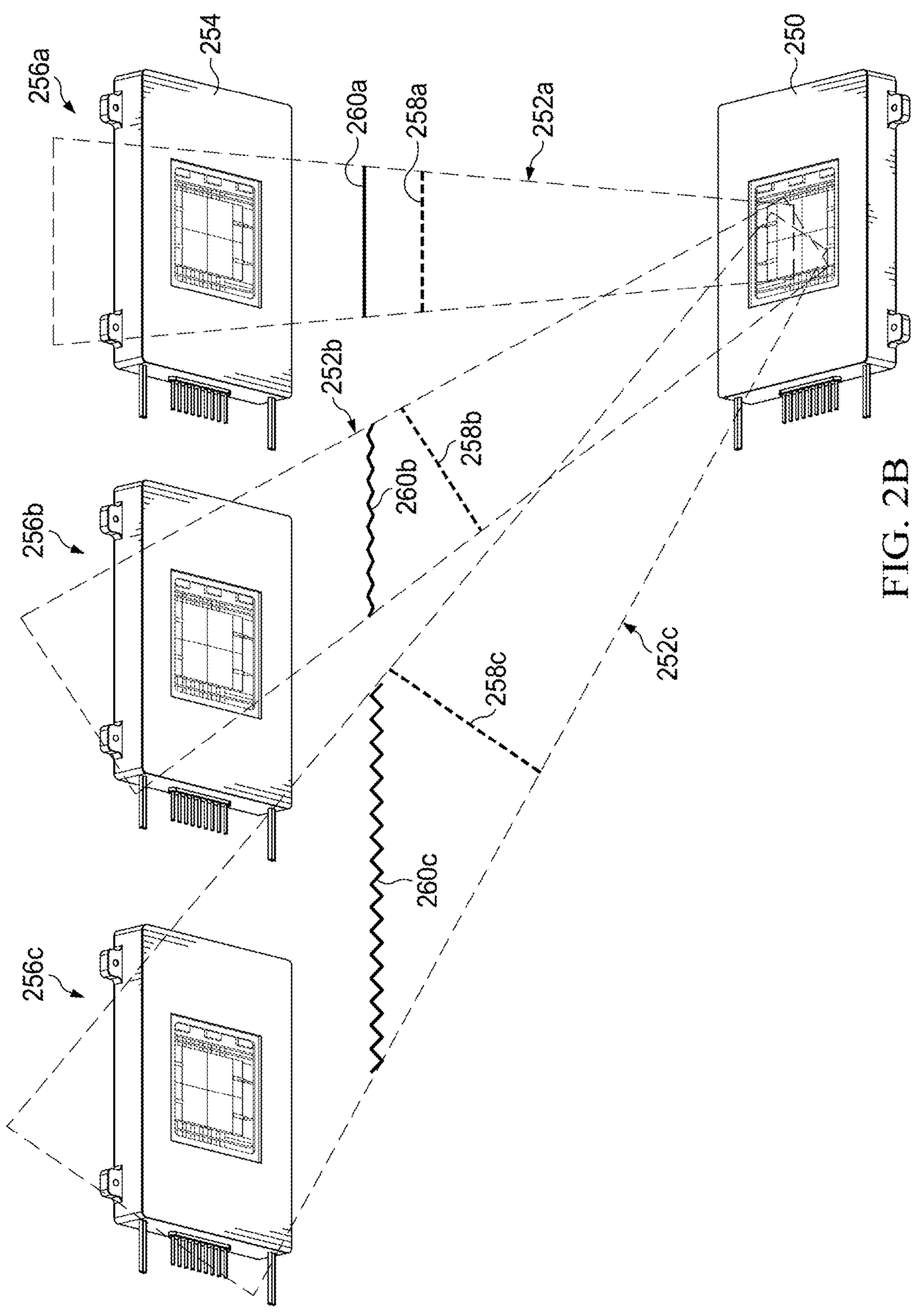

FIGS. 2A and 2B illustrate an example device 200 supporting PIC temporal and frequency dispersion squint correction for an optical phased array and associated details according to this disclosure. For ease of explanation, the device 200 may be described as representing or being used as part of one or more nodes 102 and 104 in the system 100 of FIG. 1. However, the device 200 may be used as, in, or with any other suitable device or system.

As shown in FIG. 2A, the device 200 includes a housing 202, which can be used to encase and protect other components supporting PIC-based communications or other optical interactions. The housing 202 may be formed from any suitable material(s), such as one or more metals, and in any suitable manner. The housing 202 may also have any suitable size, shape, and dimensions. In this example, the housing 202 can be secured to a support structure 204, which represents any suitable structure on or to which the housing 202 can be secured. A cover 206 may be removably connected to the housing 202 in order to selectively provide access to an interior space of the housing 202. The housing 202 also defines at least one aperture 208 through which outgoing or incoming optical signals, such as the signals 108 and 114, may pass. In this particular example, there is a single aperture, although the housing 202 may define multiple apertures (such as one aperture for transmission and one aperture for reception).

At least one optical transmitter, optical receiver, or optical transceiver is positioned within the housing 202 and communicates or otherwise interacts optically via the at least one aperture 208. For example, in some cases, the device 200 may include at least one optical transmitter 210*a* (which may represent at least one instance of the optical transmitter 106 or 112) and at least one optical receiver 210*b* (which may represent at least one instance of the optical receiver 110 or 116). In this example, the optical transmitter 210*a* and the optical receiver 210*b* are positioned side-by-side on a common support 212, which may allow the optical transmitter 210*a* and the optical receiver 210*b* to communicate via a single aperture 208 (although this is not necessarily required). In other cases, the device 200 may include at least one optical transceiver 214 (which may represent at least one instance of the optical transceiver 118 or 120) on a support 216, where the optical transceiver 214 can communicate via the aperture 208. For instance, the optical transceiver 214 may support optical transmissions at one or more wavelengths and optical receptions at one or more different wavelengths. Any suitable combination of at least two optical transmitter(s), optical receiver(s), or optical transceiver(s) may also be used in the device 200.

As shown in FIG. 2B, one common issue with optical interactions involves temporal squint. In this example, an optical transmitter or transceiver 250 is transmitting optical signals 25*a*-252*c* to at least one optical receiver or transceiver 254, which may be located at different positions 256*a*-256*c*. Depending on the circumstances, the same optical receiver or transceiver 254 may move into the different positions 256*a*-256*c*, or multiple optical receivers or transceivers 254 may be located at the different positions 256*a*-256*c*. Temporal squint exists here because temporal wavefronts 258*a*-258*c* of the optical signals 252*a*-252*c* can vary based on the position of the optical receiver or transceiver 254 relative to the optical transmitter or transceiver 250. For example, when the optical receiver or transceiver 254 is positioned orthogonal to the plane of the optical transmitter or transceiver 250 (position 256*a*), the temporal wavefront 258*a* of the optical signals 252*a* may ideally be generally parallel to the plane of the optical receiver or transceiver 254. Unfortunately, as can be seen here, the temporal wavefronts 258*b*-258*c* get progressively worse as the optical receiver or transceiver 254 moves away from the position 256*a*. This can interfere with (and in some cases even prevent) optical communications or other effective uses of the optical signals.

As described in more detail below, the optical transmitter or transceiver 250 or the optical receiver or transceiver 254 can make adjustments to transmitted or received optical signals in order to help reduce or eliminate the effects of temporal squint. In some cases, this can result in modified temporal wavefronts 260*a*-260*c* being achieved. Note that the modified temporal wavefront 260*a* may be the same as or very similar to the temporal wavefronts 258*a*. As can be seen here, each of the modified temporal wavefronts 260*a*-260*c* is generally parallel to the plane of the optical receiver or transceiver 254 regardless of its position, which enables more effective usage of the optical signals 252*a*-252*c*. While the temporal wavefronts 260*b*-260*c* are shown here as being somewhat wavy, this is merely meant to indicate that the temporal wavefronts need not be perfectly planar. Even the temporal wavefront 260*a* may typically have some variations across the wavefront. However, as can be seen here, the modified temporal wavefronts 260*b*-260*c* are significantly improved compared to the temporal wavefronts 258*b*-258*c* and are similar to the temporal wavefront 258*a*.

While not shown here, frequency dispersion squint can also be a problem, such as when the optical receiver or transceiver 254 moves between the positions 256*a*-256*c* or when multiple optical receivers or transceivers 254 are used in the positions 256*a*-256*c*. This is because differential wavelength diffraction may occur differently within the optical receiver(s) or transceiver(s) 254 depending on the positions 256*a*-256*c*, which can alter the frequency of the optical signals 252*a*-252*c* differently depending on the positions 256*a*-256*c*. As described in more detail below, the optical transmitter or transceiver 250 or the optical receiver or transceiver 254 can make adjustments to transmitted or received optical signals in order to help reduce or eliminate the effects of frequency dispersion squint.

Although FIGS. 2A and 2B illustrate one example of a device 200 supporting PIC temporal and frequency dispersion squint correction for an optical phased array and associated details, various changes may be made to FIGS. 2A and 2B. For example, the device 200 may include any suitable number of optical transmitters, optical receivers, or optical transceivers that support communications or other interactions with one or more external components. Also, the use of one optical transmitter and one optical receiver side-by-side and the use of one optical transceiver represent two example ways in which optical transmitters, optical receivers, or optical transceivers can be used, but these components may be used in any other suitable manner. Further, PIC-based communications or other interactions may be used in or by a wide range of devices and are not limited to the specific device 200 shown here. For instance, the housing 202 may instead be formed as a rotatable gimbal that can redirect one or more optical transmitters, optical receivers, or optical transceivers as needed or desired, or the optical transmitters, receivers, or transceivers may be used in satellites. Moreover, any other suitable components may be used with the device 200 to support any other desired functions of the device 200. As an example, the device 200 may include components that support the generation and transmission or the reception and processing of beacon signals, which may be used to help identify where the device 200 should be aimed to engage in optical communications or other optical interactions, or other signals. In addition, the positions, temporal wavefronts, and other details shown in FIG. 2B are for illustration only.

Figure 3:
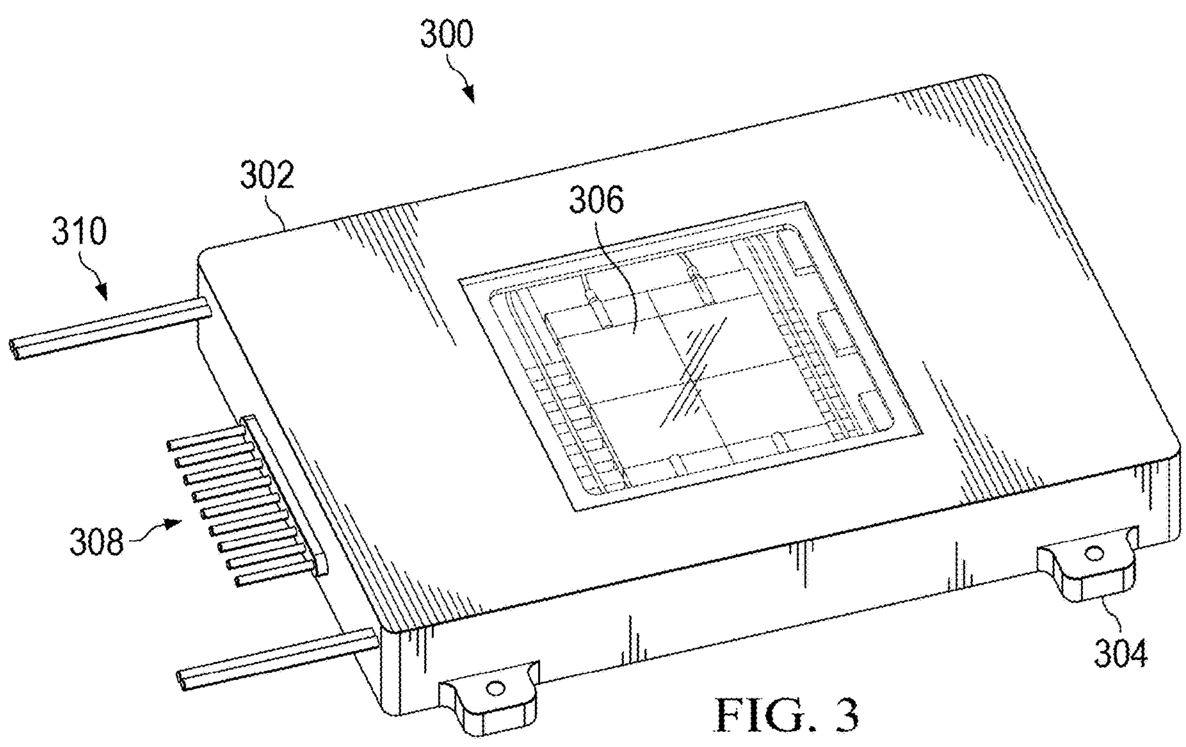
FIGS. 3 through 5 illustrate an example photonic integrated circuit-based optical device according to this disclosure.
Figure 4:
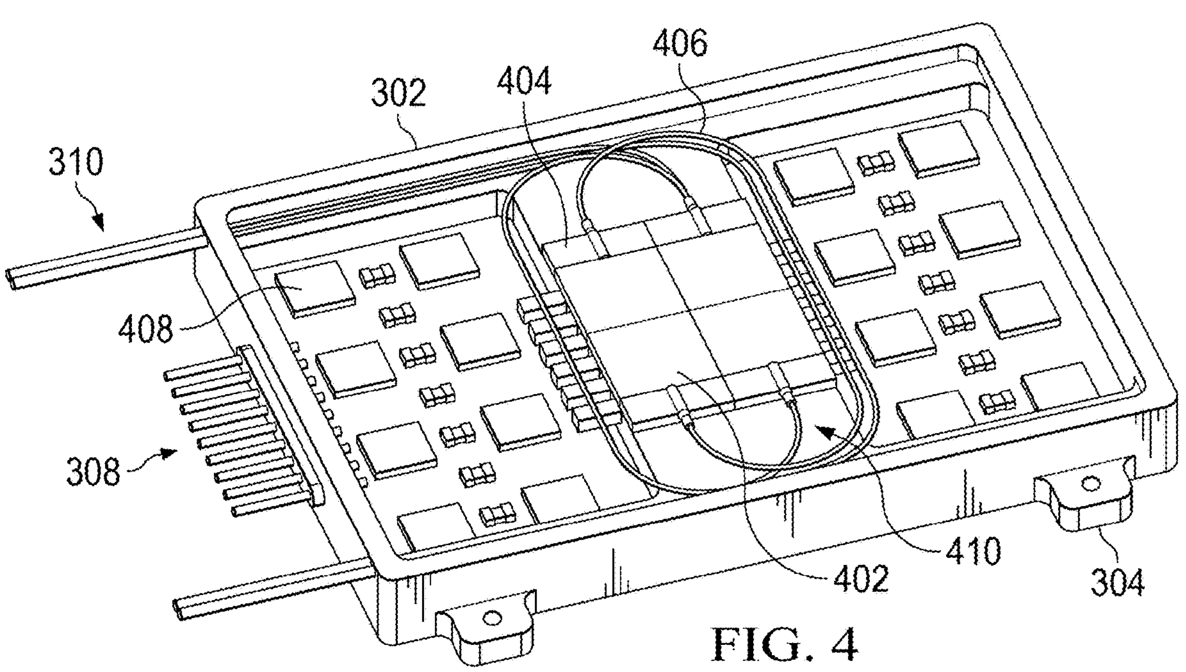
Figure 5:
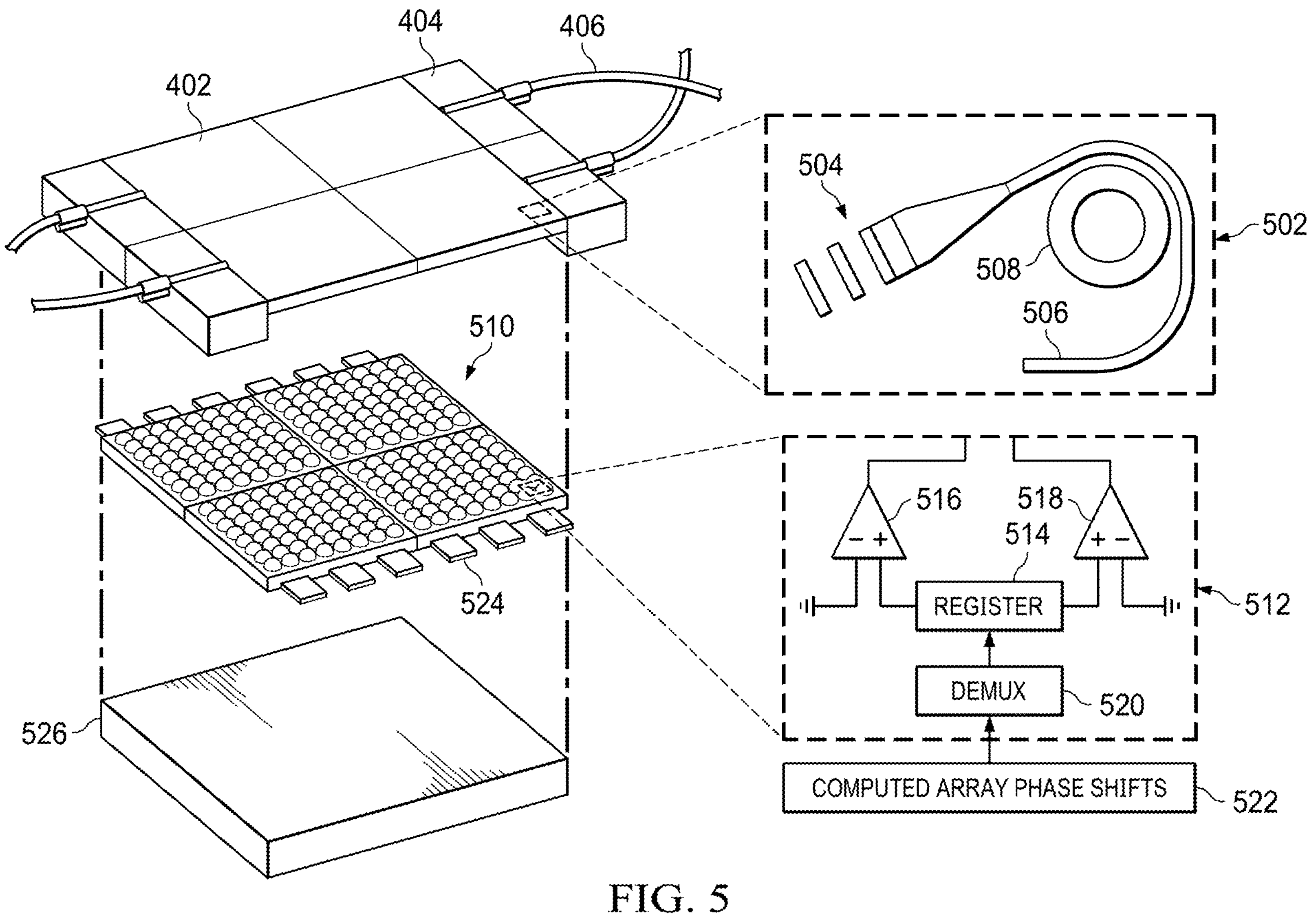

FIGS. 3 through 5 illustrate an example photonic integrated circuit-based optical device 300 according to this disclosure. For ease of explanation, the optical device 300 may be described as being used to implement one of the optical transmitter 210*a*, optical receiver 210*b*, optical transceiver 214, optical transmitter or transceiver 250, or optical receiver or transceiver 254 of FIGS. 2A and 2B, which may be used in the system 100 of FIG. 1. However, the optical device 300 may be used in any other suitable device and in any other suitable system.

As shown in FIG. 3, the optical device 300 includes a package 302, which surrounds and protects electronic and optical components of an optical transmitter, optical receiver, or optical transceiver. For example, the package 302 may encase and form a hermetic seal around the electronic and optical components. The package 302 may be formed from any suitable material(s), such as one or more metals, and in any suitable manner. In some embodiments, the package 302 is formed using a nickel-cobalt or nickel-iron alloy (such as KOVAR) or other material that has a coefficient of thermal expansion closely matched to that of borosilicate or other glass. The package 302 may also have any suitable size, shape, and dimensions. In some cases, the package 302 may be formed in multiple parts that can be bonded, sealed, or otherwise coupled together to enclose the electronic and optical components. For instance, the package 302 may be formed using a larger lower portion and an upper cover such that the electronic and optical components can be inserted into the lower portion and the upper cover can be connected to the lower portion. Also, in some cases, the package 302 may include flanges 304 that support mounting of the package 302 to a larger structure. However, the package 302 may have any other suitable form.

The package 302 includes an optical window 306, which is substantially or completely transparent optically (at least with respect to the optical signals being transmitted from or received by the optical device 300). The optical window 306 may be formed from any suitable material(s), such as borosilicate glass or other glass, and in any suitable manner. The optical window 306 may also have any suitable size, shape, and dimensions. In some cases, the optical window 306 may also function as a bandpass or other optical filter that filters the wavelength(s) of the optical signals being transmitted from or received by the optical device 300.

The package 302 may also include one or more electrical feedthroughs 308, which represent one or more electrical connections that can be used to transport one or more electrical signals between the interior and the exterior of the package 302. The one or more electrical signals may be used here for any suitable purposes, such as to control one or more operations of the optical device 300. As a particular example, the one or more electrical signals may be used for controlling the phases of antenna elements of a photonic integrated circuit in the optical device 300. In addition, the package 302 may include one or more fiber inputs/outputs 310, which can be used to provide one or more input signals to the optical device 300 or receive one or more output signals from the optical device 300. For instance, the one or more input signals may carry information to be transmitted from the optical device 300, and the one or more output signals may carry information received at and recovered by the optical device 300. In this example, there are two fiber inputs/outputs 310, although the optical device 300 may include a single fiber input/output 310 or more than two fiber inputs/outputs 310. Note, however, that no fiber inputs/outputs 310 may be needed if all optical generation and processing occurs using components within the package 302, in which case the electrical feedthroughs 308 may be used to transport information or other signals to or from the optical device 300.

As shown in FIG. 4, a photonic integrated circuit 402 is positioned within the package 302, namely at a location where the photonic integrated circuit 402 can transmit or receive optical signals through the optical window 306. As described below, the photonic integrated circuit 402 may include components used to correct temporal squint and frequency squint. The photonic integrated circuit 402 may also support a number of additional optical functions as needed or desired. The photonic integrated circuit 402 may be formed from any suitable material(s), such as silicon, indium phosphide, or gallium arsenide, and in any suitable manner. The photonic integrated circuit 402 may also have any suitable size, shape, and dimensions. As a particular example, the photonic integrated circuit 402 may be square and have an edge length of about 40 mm, although any other suitable sizes and shapes may be used here.

Fiber mounts 404 are used to couple to optical fibers 406 at locations where the optical fibers 406 can provide optical signals to or receive optical signals from the photonic integrated circuit 402. For example, the optical fibers 406 may provide optical signals from a source laser to the photonic integrated circuit 402 for use during outgoing transmissions. The optical fibers 406 may also or alternatively provide optical signals received by the photonic integrated circuit 402 to a receiver for processing. Each fiber mount 404 includes any suitable structure configured to be coupled to an optical fiber 406. Each optical fiber 406 represents any suitable length of an optical medium configured to transport optical signals to or from a photonic integrated circuit 402. Note that while four fiber mounts 404 and four optical fibers 406 are shown here, the optical device 300 may include, one, two, three, or more than four fiber mounts 404 and optical fibers 406. Also note that no fiber mounts 404 and optical fibers 406 may be needed if all optical generation and processing occurs using components of the photonic integrated circuit 402.

An electronic control board 408 includes electronic components, such as one or more integrated circuit chips and other components, that control the operation of the photonic integrated circuit 402. For example, the electronic control board 408 may include one or more components that calculate desired phases or phase corrections for optical signals to be generated by antenna elements of the photonic integrated circuit 402, which allows the electronic control board 408 to control functions such as beam forming or beam steering operations. Also or alternatively, the electronic control board 408 may include one or more components that calculate desired phases or phase corrections to be applied to optical signals received by antenna elements of the photonic integrated circuit 402, which allows the electronic control board 408 to control functions such as wavefront reconstruction operations. The electronic control board 408 includes any suitable components configured to perform one or more desired functions related to a photonic integrated circuit 402.

Spacers 410 may be positioned on opposite sides of the photonic integrated circuit 402 and used to help separate the optical fibers 406 from the electronic control board 408. The spacers 410 may be formed from any suitable material(s), such as ceramic, and in any suitable manner.

As shown in FIG. 5, the photonic integrated circuit 402 includes a number of unit cells 502. Each unit cell 502 is configured to transmit or receive one or more optical signals. The photonic integrated circuit 402 can include any suitable number of unit cells 502, possibly up to and including a very large number of unit cells 502. In some embodiments, for example, the photonic integrated circuit 402 may include an array of unit cells 502 up to a size of 1024×1024 (meaning over one million unit cells 502) or even larger. The size of the photonic integrated circuit 402 is based, at least in part, on the number and size of the unit cells 502. As noted above, in some cases, the photonic integrated circuit 402 may be square with edges of about 40 mm in length. However, the photonic integrated circuit 402 may be scaled to smaller or larger sizes (such as about 2.5 cm by about 2.5 cm), while further scaling up to even larger sizes (such as about 20 cm by about 20 cm or about 30 cm by about 30 cm) may be possible depending on fabrication capabilities.

Each unit cell 502 includes an antenna element 504, which is configured to physically transmit or receive one or more optical signals to or from one or more external devices or systems. For example, each antenna element 504 may represent a nanophotonic antenna or other antenna element that transmits or receives at least one optical signal, along with one or more lenses or other optical devices configured to focus or otherwise process the at least one optical signal. Depending on the implementation, the antenna element 504 may sometimes be referred to as an emitter in a transmitting array or a receiver in a receiving array. Each antenna element 504 may have any suitable size, shape, and dimensions. In some cases, the emitting/receiving surface of the antenna element 504 may be about 3 μm to about 4 μm in diameter. Note that while a single antenna element 504 is shown here, each unit cell 502 may include multiple antenna elements 504, such as when two antenna elements 504 are arranged orthogonally or substantially orthogonally with respect to one another. This arrangement may, for instance, provide the unit cells 502 with multi-polarization sensitivity.

Each antenna element 504 here is coupled to a signal pathway 506. The signal pathways 506 are configured to transport optical signals to or from the antenna elements 504. For example, the signal pathways 506 can provide optical signals to the antenna elements 504 for transmission. Also or alternatively, the signal pathways 506 can provide optical signals received by the antenna elements 504 to optical detectors or other components for processing. Each signal pathway 506 includes any suitable structure configured to transport optical signals, such as an optical waveguide. Note that only a portion of the signal pathway 506 may be shown in FIG. 5, since a signal pathway 506 can vary based on how the associated unit cell 502 is designed and positioned within the photonic integrated circuit 402.

Modulators 508 are provided in the unit cells 502 for the antenna elements 504 and are used (among other things) to control the phases of optical signals transmitted or received by the associated antenna elements 504. For example, when the antenna elements 504 are transmitting, the modulators 508 can be used to achieve desired phases of outgoing optical signals in order to support functions such as beam forming or beam steering. When the antenna elements 504 are receiving, the modulators 508 can be used to apply phase control to the incoming wavefront of received optical signals in order to support functions such as decomposing or reconstructing the wavefront. Each modulator 508 includes any suitable structure configured to modulate the phase of an optical signal, such as a resonant micro-ring modulator or a PN junction micro-ring modulator. In some cases, each modulator 508 may be a resonant micro-ring modulator that is about 5.5 μm in diameter, although modulators of other sizes may be used here.

The modulators 508 of the photonic integrated circuit 402 are electrically coupled to a digital read in integrated circuit (DRIIC) layer 510, which is used to provide electrical signals to the modulators 508 in order to control the phase modulations applied to the incoming or outgoing optical signals by the modulators 508. In some embodiments, the photonic integrated circuit 402 can be "flip-chip" bonded to the DRIIC layer 510, although other mechanisms for electrically coupling the photonic integrated circuit 402 and the DRIIC layer 510 may be used.

The DRIIC layer 510 in this example includes a number of individual DRIIC cells 512, where each DRIIC cell 512 may be associated with (and in some cases may have about the same size as) a corresponding one of the unit cells 502. The DRIIC cells 512 control the phase modulations that are applied by the modulators 508 of the unit cells 502. The DRIIC cells 512 may essentially function as digital-to-analog conversion devices, where digital programming (such as 2-bit, 8-bit, or other digital values) are converted into appropriately-scaled direct current (DC) analog voltages spanning a specific range of voltages. As a particular example, the DRIIC cells 512 may operate to convert digital values into suitable DC analog voltages between 0 V and 3.3 V, although other voltages (including negative voltages) can be supported depending on the implementation.

In this example, each DRIIC cell 512 may include a register 514 configured to store values associated with different phase shifts to be applied by the modulator 508 of its corresponding unit cell 502. To provide a desired phase shift, appropriate values from the register 514 are selected and provided to two amplifiers 516 and 518, which generate output voltages that are provided to the associated modulator 508. The output voltages control the phase shift provided by the associated modulator 508. Different values from the register 514 are provided to the amplifiers 516 and 518 over time so that different output voltages are applied to the associated modulator 508. In this way, each DRIIC cell 512 can cause its associated modulator 508 to provide different phase shifts over time, thereby supporting various functions like beam forming, beam steering, or wavefront reconstruction.

In some embodiments, each DRIIC cell 512 may be used to provide a relatively small number of different output voltages to its associated modulator 508. For example, in some cases, each DRIIC cell 512 can cause the associated modulator 508 to provide four different phase shifts. However, other numbers of output voltages and associated phase shifts may be supported here, such as when up to 256 different phase shifts or more are supported. Also, the output voltages provided to the modulators 508 by different DRIIC cells 512 may be different even when those modulators 508 are providing the same phase shift, which may be due to factors such as manufacturing tolerances. The actual output voltages used for each modulator 508 can be selected during calibration so that appropriate values may be stored in each register 514.

In this example, the actual values in each DRIIC cell 512 that are provided to the amplifiers 516 and 518 by the register 514 over time can be controlled using a demultiplexer 520. Each demultiplexer 520 receives a stream of computed array phase shifts 522 and outputs the phase shifts 522 that are to be applied by that DRIIC cell's associated modulator 508. The phase shifts 522 output by the demultiplexer 520 can identify or otherwise to be used to select specific values from the register 514 to be output to the amplifiers 516 and 518. The computed array phase shifts 522 here may be provided by one or more external components, such as the electronic control board 408 or an external component communicating with the electronic control board 408. While not shown here, array-level deserialization circuitry may be used to separate and fan out high-speed digital signals to the array of individual DRIIC cells 512.

Each register 514 includes any suitable structure configured to store and retrieve values. Each amplifier 516 and 518 includes any suitable structure configured to generate a control voltage or other control signal based on an input. Each demultiplexer 520 includes any suitable structure configured to select and output values.

Note that this represents one example way in which the modulators 508 of the unit cells 502 can be controlled. In general, any suitable technique may be used to provide suitable control voltages or other control signals to the modulators 508 for use in controlling the phase shifts provided by the modulators 508. For example, the approach shown in FIGURE allows values that are applied to the amplifiers 516 and 518 to be stored in the register 514 and retrieved as needed, which allows an external component to provide indicators of the desired values to be retrieved to the DRIIC cells 512. In other embodiments, an external component may provide digital values that are converted by different circuitry into analog values.

Various electrical connections 524 are provided in or with the DRIIC layer 510. The electrical connections 524 may be used to provide electrical signals to the DRIIC cells 512, such as when the electrical connections 524 are used to receive high-speed digital signals containing the computed array phase shifts 522 for the DRIIC cells 512. Any suitable number and arrangement of electrical connections 524 may be used here.

A thermal spreader 526 can be positioned in thermal contact with the DRIIC layer 510. The thermal spreader 526 helps to provide a more consistent temperature across the DRIIC layer 510 and the photonic integrated circuit 402 by functioning as a heat sink that removes thermal energy from the DRIIC layer 510 and the photonic integrated circuit 402. At times, the thermal spreader 526 may also provide thermal energy to the DRIIC layer 510, which helps to heat the DRIIC layer 510 and the photonic integrated circuit 402. Thermal energy that is generated by the DRIIC layer 510 or injected into the photonic integrated circuit 402 may vary over time, and the thermal spreader 526 can help to maintain a substantially constant temperature of the photonic integrated circuit 402. The thermal spreader 526 may be formed from any suitable material(s), such as one or more metals like copper, and in any suitable manner. The thermal spreader 526 may also have any suitable size, shape, and dimensions.

Although FIGS. 3 through 5 illustrate one example of a photonic integrated circuit-based optical device 300, various changes may be made to FIGS. 3 through 5. For example, one or more photonic integrated circuits may be packaged in any other suitable manner, arranged relative to other components in any other suitable manner, and coupled to other components in any other suitable manner. Also, any other suitable modulation control approach and any other suitable thermal management approach may be used with one or more photonic integrated circuits.

Figure 6:
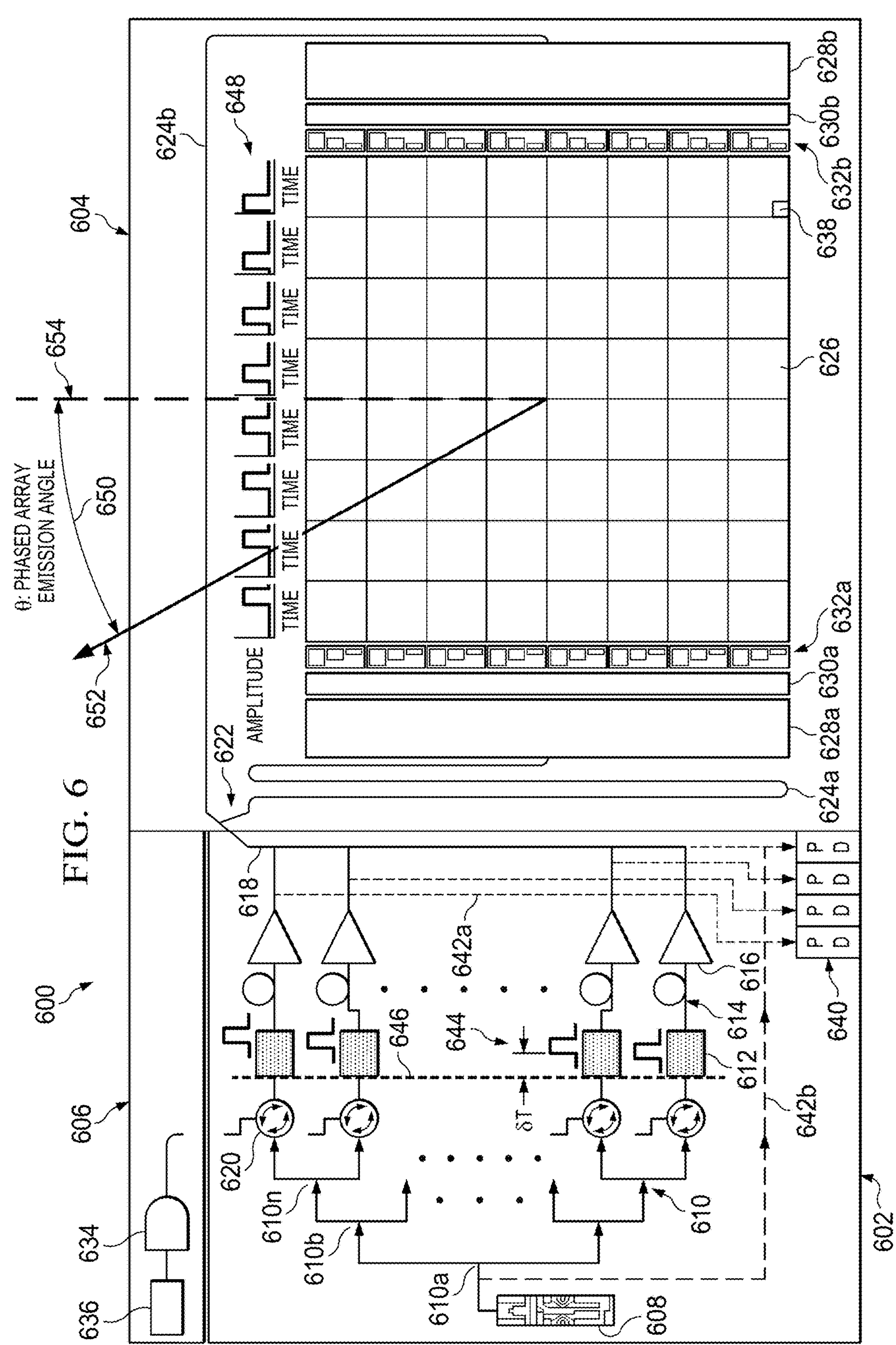
FIGS. 6 and 7 illustrate an example architecture of a photonic integrated circuit supporting temporal squint correction for an optical phased array according to this disclosure.
Figure 7:
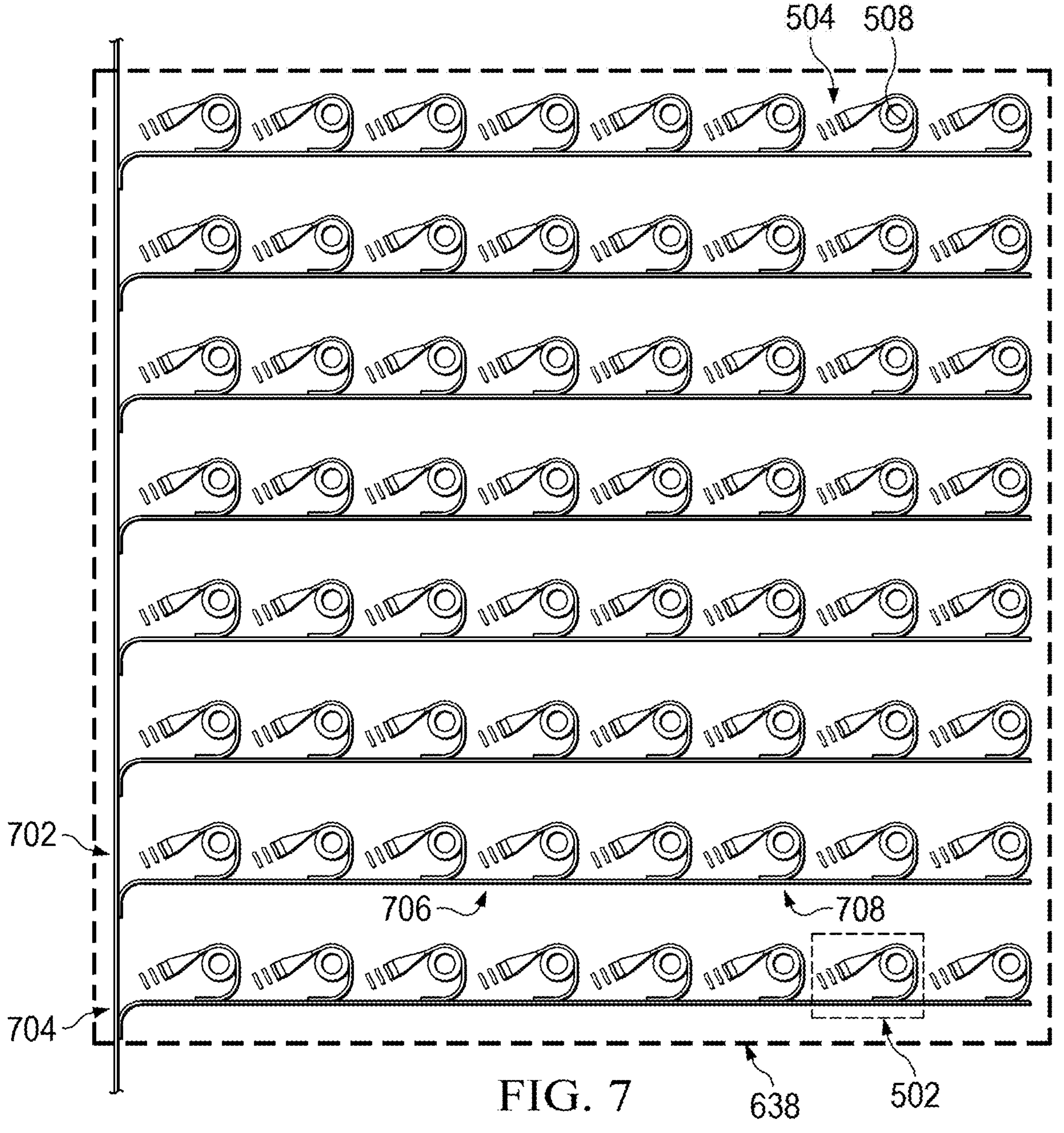

FIGS. 6 and 7 illustrate an example architecture 600 of a photonic integrated circuit supporting temporal squint correction for an optical phased array according to this disclosure. For example, the architecture 600 may represent an example implementation of the photonic integrated circuit-based optical device 300 of FIGS. 3 through 5. In particular, the example architecture 600 of FIGS. 6 and 7 may be implemented within or using the photonic integrated circuit 402 of the optical device 300.

As shown in FIG. 6, the architecture 600 includes a source laser 602, an OPA 604, and a receiver 606. The source laser 602 generally operates to produce optical signals that are used by the OPA 604 to transmit outgoing optical signals. The OPA 604 generally operates to transmit outgoing optical signals and to receive incoming optical signals. The receiver 606 generally operates to process the incoming optical signals. These components allow the architecture 600 to support optical transceiver functionality, although some components may be removed from the architecture 600 if only optical transmitter or only optical receiver functionality is desired.

In this example, the source laser 602 includes a laser 608, which operates to produce a lower-power input beam. The laser 608 includes any suitable structure configured to generate a laser output, such as a distributed feedback (DFB) diode laser. The lower-power input beam can have any suitable power level based on the laser 602 being used for a specific application. In some cases, the lower-power input beam may have a power level of one or several tens of milliwatts to one or several hundreds of milliwatts, although these values are for illustration only. Also, in some cases, the laser 602 may be fabricated using at least one group III element and at least one group V element and may therefore be referred to as a "III-V" laser. However, any other suitable materials may be used to fabricate the laser 602.

The lower-power input beam is provided to a splitter 610, which generally operates to split the input beam into optical signals traveling over different optical pathways. In this example, the splitter 610 includes a hierarchical arrangement of splitters **610*a*-610*n*, each of which can receive and split an optical input in order to produce two optical outputs of substantially equal power. Note that the number of splitters 610*a*-610*n* and the number of hierarchical levels of splitters 610*a*-610*n*** can vary based on the number of optical signals (beamlets) to be produced. For example, there may be five levels of splitters if thirty-two optical signals are desired or six levels of splitters if sixty-four optical signals are desired. However, other numbers of optical signals may be produced using any suitable number of splitters. Also note that any other suitable structure(s) may be used to split an optical signal, such as a multi-mode interferometer or a coupler tree.

The optical signals from the splitter 610 are provided to an array of electro-optic modulators (EOMs) 612, each of which can modulate one of the optical signals based on an input electrical signal. Each electro-optic modulator 612 can provide any suitable modulation here, such as amplitude modulation or phase modulation (depending on waveform type). Moreover, the modulations performed by the electro-optic modulators 612 can be delayed by different amounts (δT) to correct for temporal squint as described in more detail below. In some cases, this allows the electro-optic modulators 612 to provide step-wise compensation of time delay effects across the photonic integrated circuit 402. Each electro-optic modulator 612 includes any suitable structure configured to optically modulate an optical signal, such as a Mach-Zehnder modulator (MZM).

The optical signals from the array of electro-optic modulators 612 can be phase shifted using an array of phase shifters 614, where each phase shifter 614 can shift the phase of one of the optical signals. Each phase shifter 614 includes any suitable structure configured to phase-shift an optical signal, such as a resonant micro-ring modulator. In some embodiments, the resonant micro-ring modulators may be silicon-based and have diameters of about 5 microns to about 6 microns, although other implementations of the phase shifters 614 may be used.

The phase-shifted optical signals are provided to an array of semiconductor optical amplifiers (SOAs) 616. Each semiconductor optical amplifier 616 amplifies one of the phase-shifted optical signals to produce a higher-power version of that optical signal. Each semiconductor optical amplifier 616 represents any suitable semiconductor-based amplifier configured to amplify an optical signal. Each of the amplified optical signals can have any suitable power level based on the semiconductor optical amplifiers 616 being used. In some cases, the amplified optical signals may each have a power level of about three watts, although this value is for illustration only. The amplified optical signals can be combined and transported over an optical waveguide 618, which allows for source-coherent combination of the outputs from the semiconductor optical amplifiers 616 (since the amplifiers 616 form a phase-locked array of SOAs). Note that the paths or arms of the source laser 602 also include circulators 620, which can support usage of the electro-optic modulators 612, phase shifters 614, and semiconductor optical amplifiers 616 during receive operations as described below.

The combined signal is provided via the optical waveguide 618 to the OPA 604. In the OPA 604, the combined signal is split by a splitter 622 so that substantially equal first portions of the combined signal are provided to two waveguides 624*a*-624*b*. The waveguides 624*a*-624*b* here may have substantially the same length so that there is little or no phase difference between the first portions of the combined signal exiting the waveguides 624*a*-624*b*. In this example, the photonic integrated circuit 402 is implemented using supercells 626, where each supercell 626 includes a subset of the unit cells 502. In some embodiments, for example, each supercell 626 may include a 32×32 arrangement of unit cells 502, although other numbers and arrangements of unit cells 502 may be used in each supercell 626. In this particular example, the photonic integrated circuit 402 includes sixty-four supercells 626, although other numbers of supercells 626 may be used. Multiple supercells 626 can be driven using the same portion of the combined signal from the source laser 602, which helps to simplify phase control and other operations in the architecture 600. The ability to drive all unit cells 502 in a supercell 626 collectively allows, for instance, modulation of each supercell 626 to control the transmit power of the unit cells 502 in that supercell 626.

In order to drive the supercells 626 using the combined signal from the source laser 602, the waveguides 624*a*-624*b* provide the first portions of the combined signal to splitters 628*a*-628*b*, such as 1×8 optical splitters, which split the first portions of the combined signal into more-numerous second portions of the combined signal. Additional splitters 630*a*-630*b*, such as 8×32 splitters, split the second portions of the combined signal into even more-numerous third portions of the combined signal. This results in the creation of sixty-four optical signals, which can be used to drive the supercells 626. Note that this arrangement of 1×8 and 8×32 splitters is merely one example of how the supercells 626 in this specific photonic integrated circuit 402 may be driven. Other approaches may be used to drive a photonic integrated circuit 402, including approaches that use other numbers or arrangements of splitters. The specific approach shown in FIG. 6 is merely one example of how supercells 626 of this specific photonic integrated circuit 402 may be driven.

Time delay paths 632*a*-632*b* are provided between the splitters 630*a*-630*b* and the supercells 626 in order to compensate for different optical path lengths to reach the different supercells 626. For example, assume that each row of supercells 626 in the photonic integrated circuit 402 is driven using four outputs from the splitter 630*a* and four outputs from the splitter 630*b*. Without compensation, different outputs from the splitters 630*a*-630*b* would reach different supercells 626 at different times, which can create undesired phase differences and reduce the throughput of the architecture 600. The time delay paths 632*a*-632*b* represent spiraled or other optical pathways that delay at least some of the outputs from the splitters 630*a*-630*b* so that the outputs from the splitters 630*a*-630*b* reach all supercells 626 at substantially the same time. For example, the time delay paths 632*a*-632*b* may delay signals to closer supercells 626 by larger amounts and delay signals to farther supercells 626 by smaller or no amounts. The optical signals that are received at the supercells 626 are used by the supercells 626 to produce outgoing optical signals.

The supercells 626 may also receive incoming optical signals, which can be transported over the waveguides 624*a*-624*b* and through the electro-optic modulators 612, phase shifters 614, and semiconductor optical amplifiers 616. The incoming optical signals are then provided via the circulators 620 to the receiver 606. In this example, the receiver 606 includes at least one photodetector 634, such as at least one photodiode that converts the received incoming optical signals into electrical currents. A transimpedance amplifier 636 converts the electrical currents into electrical voltages, which can then be further processed (such as to recover information contained in the incoming optical signals). In some embodiments, circulator 620 may be coupled to its own photodetector 634, and each photodetector 634 may be coupled to a transimpedance amplifier 636.

Note that the source laser 602 and various components of the OPA 604 may be fabricated from different materials in order to allow for different optical power levels to be used in the architecture 600. For example, components of the source laser 602 may be fabricated using silicon nitride, germanium, or other materials that allow the source laser 602 to generate a relatively high-power combined beam for the OPA 604. In the OPA 604, the waveguides 624*a*-624*b* and the splitters 628*a*-628*b* may similarly be fabricated using silicon nitride or other materials that support the transport and splitting of the relatively high-power combined beam from the source laser 602. The splitters 630*a*-630*b* may be fabricated using silicon (rather than silicon nitride) or other materials that can split lower-power optical signals (since the optical energy from the source laser 602 has already been split at this point). However, the components of the architecture 600 may be fabricated from any other suitable materials. Also note that various components of the architecture 600 may or may not be fabricated using one or more common materials.

A portion 638 of one of the supercells 626 is identified in FIG. 6 and shown in greater detail in FIG. 7. As shown in FIG. 7, this portion 638 of the supercell 626 includes an 8×8 arrangement of unit cells 502, where each unit cell 502 has the same or similar structure to that shown in FIG. 5 (note, however, that the structure of each unit cell 502 can be modified as needed or desired). These unit cells 502 are fed using a feed path 702, where splitters 704 are positioned along the feed path 702 to split off portions of an optical signal. These portions of the optical signals are provided over feed paths 706, where splitters 708 are positioned along the feed paths 706 to further split off portions of the optical signal. Ideally, the splitters 704 and 708 are configured such that each of the unit cells 502 receives a substantially equal portion of the optical signal input to the feed path 702. In some embodiments, the feed paths 702, 706 and splitters 704, 708 may be formed from silicon, although other materials may be used here.

In FIG. 7, it can be seen that different path lengths exist between the input of the feed path 702 (located at the bottom of the feed path 702 in FIG. 7) and different unit cells 502. In this particular example, the shortest path length exists between the input of the feed path 702 and the bottom left unit cell 502, and the longest path length exists between the input of the feed path 702 and the top right unit cell 502. As with the supercells 626 themselves, without compensation, these different path lengths would cause different portions of an optical signal to reach the unit cells 502 at different times. In some cases, the phase shifts provided by the modulators 508 in the unit cells 502 can, among other things, be used to compensate for the different path lengths between the input of the feed path 702 and each unit cell 502. Also or alternatively, linear or other phase shifters may be used to compensate for the different path lengths between the input of the feed path 702 and each unit cell 502.

Note that if each supercell 626 includes a 32×32 arrangement of unit cells 502, each supercell 626 would include thirty-two rows of unit cells 502, where each row includes thirty-two unit cells 502. Thus, the portion 638 shown in FIG. 7 would be replicated sixteen times within each supercell 626. However, it is possible for the supercells 626 to each have a different number and arrangement of unit cells 502 as needed or desired.

In some embodiments, all of the components in the architecture 600 of FIG. 6 may be implemented in an integrated manner, such as when implemented using a single integrated electrical and photonic chip. As noted above, for example, different components of the architecture 600 may be fabricated using silicon and silicon nitride, which enables fabrication using standard silicon-based processes. When implemented in an integrated manner, the architecture 600 may be implemented using a single photonic integrated circuit chip, and there may be no need for components such as the fiber inputs/outputs 310, fiber mounts 404, and optical fibers 406. However, integration of the components in the architecture 600 is not necessarily required. Thus, for example, the source laser 602 may be implemented off-chip or replaced using a standard erbium-doped fiber amplifier laser or other external laser. As another example, the receiver 606 may be implemented off-chip.

As can be seen in FIG. 6, photodetectors 640 may be used in the source laser 602. Samples of the optical signals produced by the semiconductor optical amplifiers 616 can be obtained via signal lines 642*a* and mixed (heterodyned) with samples of the lower-power input beam from the laser 608 obtained via a signal line 642*b*. The photodetectors 640 receive these heterodyned signals and generate measurements of the heterodyned signals. Outputs of the photodetectors 640 can be used to control components of the source laser 602 (such as the electro-optic modulators 612) in order to phase-lock the individual paths or arms within the source laser 602. As a particular example, the electronic control board 408 may use the outputs of the photodetectors 640 to adjust the electro-optic modulators 612 in order to phase-lock the individual arms within the source laser 602.

As noted above, the modulations provided by the electro-optic modulators 612 can be delayed by different amounts (ST) to correct for temporal squint. In this example, the modulations provided by the electro-optic modulators 612 can be controlled according to delays 644 in control signals provided to the electro-optic modulators 612 (the delays 644 can be expressed relative to a common time 646 here for convenience). These delays 644 impart various delays 648 to optical signals being transmitted or received by different supercells 626 of the photonic integrated circuit 402. For example, the delays 648 may represent different delays associated with transmissions or receptions of optical signals by different rows, different columns, or other different subsets of supercells 626 in the photonic integrated circuit 402.

In this particular example, the delays 644 decrease going down along the different arms within the source laser 602, and the delays 648 show a similar pattern (although these delays 644, 648 are for illustration only). This allows the electro-optic modulators 612 to provide step-wise compensation of time delay effects across the photonic integrated circuit 402. This step-wise compensation (in other words, the timing and spacing of the delays 644) can be determined as a function of a transmit/receive angle 650. Here, the transmit/receive angle 650 is defined as the angle between a direction 652 in which optical signals are being transmitted or received and a nominal direction 654, which may be orthogonal to a plane of the OPA 604 in some cases.

During some times, the transmit/receive angle 650 is at or close to 0°, such as when the optical transmitter or transceiver 250 is interacting with the optical receiver or transceiver 254 in the position 256*a*. During those times, the delays 644 may be equal or substantially equal for all arms of the source laser 602, which can cause the delays 648 to be equal or substantially equal for all supercells 626 in the photonic integrated circuit 402. As a result, the supercells 626 may transmit optical signals at the same or substantially the same time, or the same or substantially the same delays may be applied to optical signals received by the supercells 626. For transmissions, this helps the temporal wavefront 260*a* of the transmitted optical signals 252*a* to be generally parallel to the plane of the optical receiver or transceiver 254. However, the transmit/receive angle 650 may depart further and further from over time, such as when the optical transmitter or transceiver 250 is interacting with the optical receiver or transceiver 254 in the position 256*b* and then in the position 256*c*. Because of this, the delays 644 may become more spaced in time for the different arms of the source laser 602, which can cause the delays 648 to behave similarly. As a result, different delays can be used for optical signals being transmitted or received by the supercells 626. For transmissions, this helps the temporal wavefront 260*b* or 260*c* of the transmitted optical signals 252*b* or 252*b* to be generally parallel to the plane of the optical receiver or transceiver 254. Thus, the delays 244 that are used here can be determined (such as by the electronic control board 408) based on the transmit/receive angle 650. Note that it is possible here to design the time delay components so that any time delay is a small fraction of a waveform's optical bandwidth, which can reduce or eliminate any effects on the phasing fidelity of the waveform.

Although FIGS. 6 and 7 illustrate one example of an architecture 600 of a photonic integrated circuit 402 supporting temporal squint correction for an optical phased array 604, various changes may be made to FIGS. 6 and 7. For example, this particular embodiment logically splits the photonic integrated circuit 402 in half by using two waveguides 624*a*-624*b*, two sets of splitters 628*a*-628*b*, 630*a*-630*b*, and two sets of time delay paths 632*a*-632*b*. However, the photonic integrated circuit 402 may be logically split into other numbers of portions or not logically split. Also, various components in FIGS. 6 and 7 may be combined, further subdivided, replicated, omitted, or rearranged and additional components may be added according to particular needs.

Figure 8:
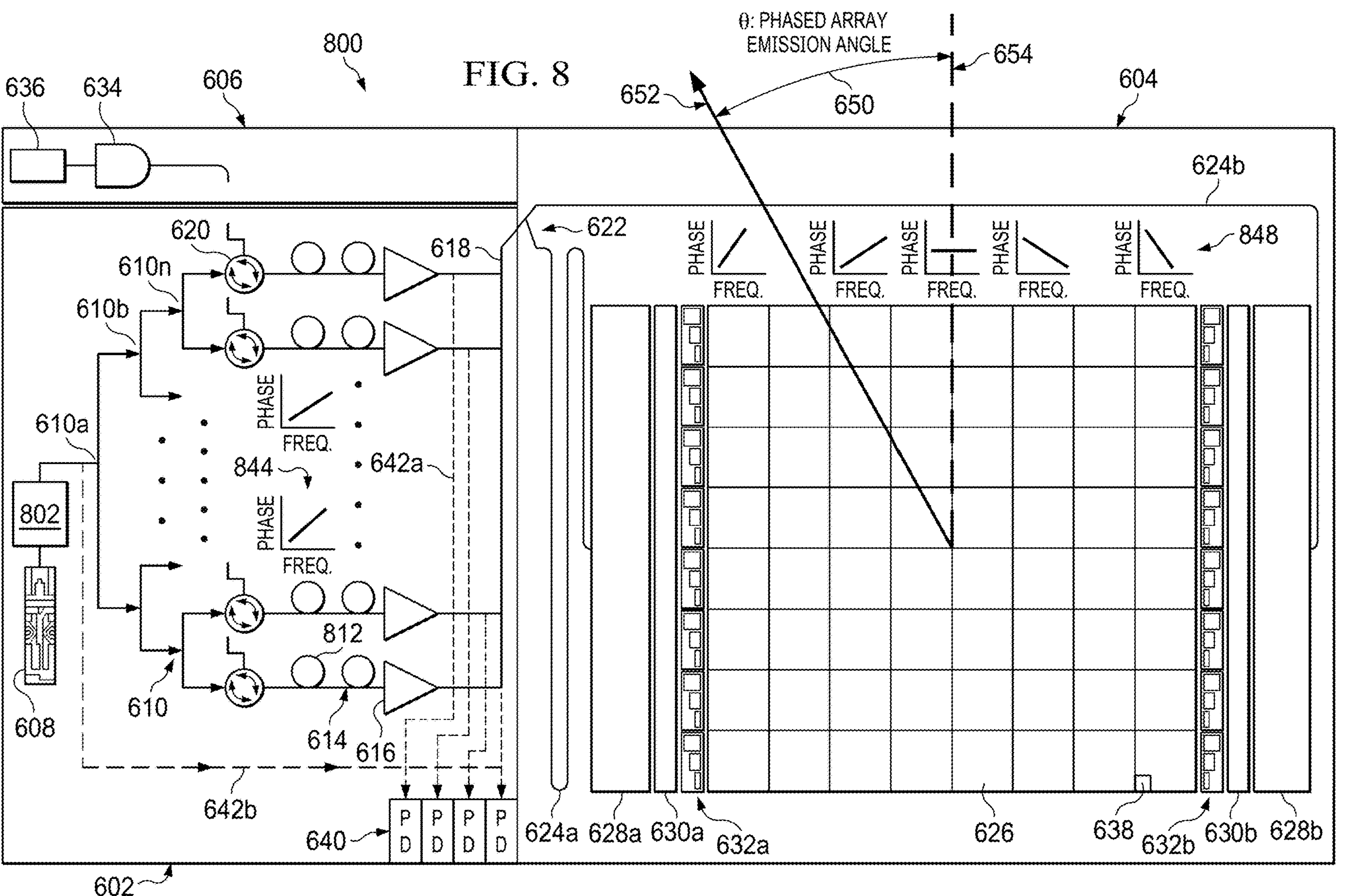
FIG. 8 illustrates an example architecture of a photonic integrated circuit supporting frequency dispersion squint correction for an optical phased array according to this disclosure.

FIG. 8 illustrates an example architecture 800 of a photonic integrated circuit supporting frequency dispersion squint correction for an optical phased array according to this disclosure. For example, the architecture 800 may represent an example implementation of the photonic integrated circuit-based optical device 300 of FIGS. 3 through 5. In particular, the example architecture 800 of FIG. 8 may be implemented within or using the photonic integrated circuit 402 of the optical device 300. Note that the architecture 800 includes many of the same components as the architecture 600 discussed above, so common reference numerals as used here to denote common components in the architectures 600 and 800.

As shown in FIG. 8, an electro-optic modulator 802 is positioned to modulate the lower-power input beam from the laser 608 prior to splitting via the splitter 610. For example, the electro-optic modulator 802 can modulate the lower-power input beam based on an input electrical signal. The electro-optic modulator 802 can provide any suitable modulation here, such as when the electro-optic modulator 802 is implemented as a Mach-Zehnder modulator (MZM) or other modulator that provides amplitude modulation.

The source laser 602 also includes an array of dispersive compensation elements 812 positioned in the arms of the source laser 602. In some embodiments, each dispersive compensation element 812 may represent at least one resonant micro-ring modulator or other type of modulator. The dispersive compensation elements 812 can be controlled to optimize the frequency dispersion for each supercell 626. As shown here, a control signal for each dispersive compensation element 812 can be used to control the phase-frequency relationship 844 of the dispersive compensation element 812, meaning the control signal can adjust how the dispersive compensation element 812 alters the phase of an optical signal based on frequency. Different phase-frequency relationships 844 allow for different dispersive compensation corrections to be performed. This imparts various phase-frequency relationships 848 to optical signals being transmitted or received by different supercells 626 of the photonic integrated circuit 402.

In this particular example, the phase-frequency relationships 844 used in the source laser 602 translate into different phase-frequency relationships 848 used in the OPA 604. This allows the dispersive compensation elements 812 to provide step-wise frequency dispersion compensation across the photonic integrated circuit 402. This step-wise compensation (in other words, the changes in the phase-frequency relationships 848) can be determined as a function of the transmit/receive angle 650.

During some times, the transmit/receive angle 650 is at or close to 0°, such as when the optical transmitter or transceiver 250 is interacting with the optical receiver or transceiver 254 in the position 256*a*. During those times, the phase-frequency relationships 844 may be flat or substantially flat for all arms of the source laser 602, which can cause the phase-frequency relationships 848 to be flat or substantially flat for all supercells 626 in the photonic integrated circuit 402. However, the transmit/receive angle 650 may depart further and further from 0° over time, such as when the optical transmitter or transceiver 250 is interacting with the optical receiver or transceiver 254 in the position 256*b* and then in the position 256*c*. Because of this, the phase-frequency relationships 844 can vary (such as by becoming steeper) for the different arms of the source laser 602, which can cause the phase-frequency relationships 848 to behave similarly. Thus, the phase-frequency relationships 844 that are used here can be determined (such as by the electronic control board 408) based on the transmit/receive angle 650. Note that it is possible here to design the frequency dispersion components so that any residual errors are a small fraction of a waveform's optical bandwidth, which can reduce or eliminate any effects on the phasing fidelity of the waveform or the achievable data rate.

Again, the photodetectors 640 may be used in the source laser 602 to generate measurements of heterodyned signals produced by mixing samples of the optical signals from the semiconductor optical amplifiers 616 and samples of the lower-power input beam from the laser 608. Outputs of the photodetectors 640 can be used to control components of the source laser 602 (such as the dispersive compensation elements 812) in order to phase-lock the individual paths or arms within the source laser 602. As a particular example, the electronic control board 408 may use the outputs of the photodetectors 640 to adjust the dispersive compensation elements 812 in order to phase-lock the individual arms within the source laser 602.

Although FIG. 8 illustrates one example of an architecture 800 of a photonic integrated circuit 402 supporting frequency dispersion squint correction for an optical phased array 604, various changes may be made to FIG. 8. For example, this particular embodiment again logically splits the photonic integrated circuit 402 in half by using two waveguides 624*a*-624*b*, two sets of splitters 628*a*-628*b*, 630*a*-630*b*, and two sets of time delay paths 632*a*-632*b*. However, the photonic integrated circuit 402 may be logically split into other numbers of portions or not logically split. Also, various components in FIG. 8 may be combined, further subdivided, replicated, omitted, or rearranged and additional components may be added according to particular needs.

Figure 9:
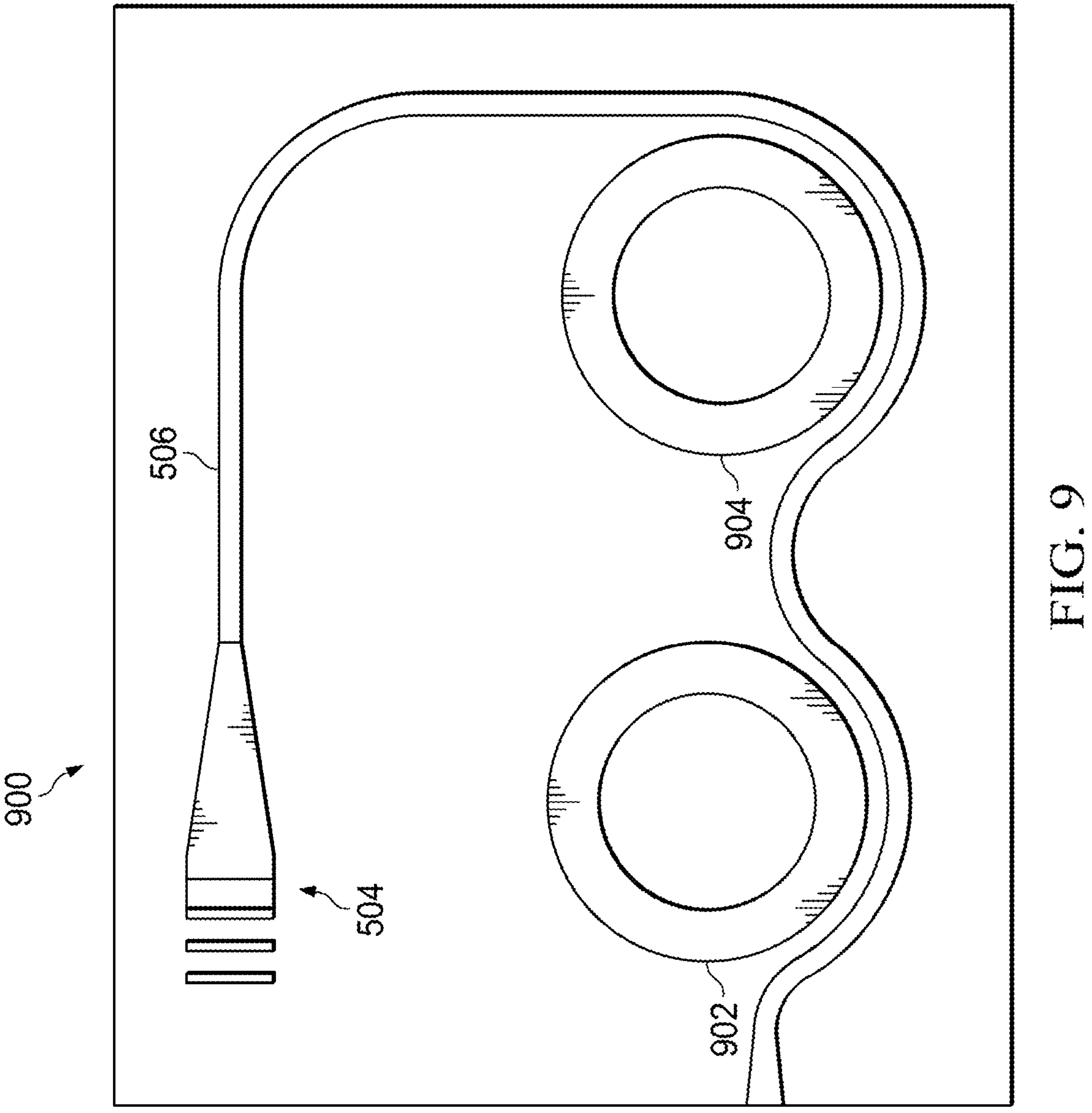
FIG. 9 illustrates an example cascaded-modulator technique that may be used for phase and dispersion control for an optical phased array according to this disclosure.

FIG. 9 illustrates an example cascaded-modulator technique that may be used for phase and dispersion control for an optical phased array according to this disclosure. This technique may be useful, for example, in the architecture 800 of FIG. 8 to provide frequency dispersion squint correction.

As shown in FIG. 9, each antenna element 504 may be used in conjunction with multiple modulators 902 and 904 arranged in a cascaded configuration. In some embodiments, the modulators 902 and 904 may represent multiple modulators used in each unit cell 502, meaning each unit cell 502 of the photonic integrated circuit 402 may be modified to include multiple modulators (such as multiple instances of the modulator 508). In other embodiments, the modulators 902 and 904 may represent at least one modulator used in each unit cell 502 (such as at least one modulator 508) and at least one modulator outside of the unit cell 502 (such as at least one modulator implementing a dispersive compensation element 812). In still other embodiments, the modulators 902 and 904 may represent multiple modulators outside of the unit cell 502 (such as multiple modulators implementing a dispersive compensation element 812), meaning each unit cell 502 of the photonic integrated circuit 402 may be modified to include no modulators. Note that while two modulators 902 and 904 are shown here, more than two modulators may be cascaded and used. Thus, for instance, the modulators that are used here may include one or more modulators within each unit cell 502 and/or one or more modulators implementing a dispersive compensation element 812.

The different modulators 902 and 904 shown here may be designed or controlled differently in order to support phase and dispersion control. For example, coupling parameters between the signal pathway 506 and the modulators 902 and 904 (such as gaps between the signal pathway 506 and the modulators 902 and 904) may be different in order to provide different response characteristics of the modulators 902 and 904. As a particular example of this, one modulator 902 or 904 may provide higher or lower amplitude changes at one or more wavelengths or wavelength bands than the other modulator 904 or 902 provides at the same wavelength(s) or wavelength band(s). As another particular example of this, the modulators 902 and 904 may provide different phase shifts at one or more wavelengths or wavelength bands. Providing multiple modulators 902 and 904 with different response characteristics can therefore support effective control of both phase and frequency dispersion of optical signals flowing through the signal pathway 506. Knowledge of the response characteristics of the modulators 902 and 904 can therefore be used (such as by the electronic control board 408) to control the modulators 902 and 904 in order to achieve a desired phase-frequency relationship 844.

Although FIG. 9 illustrates one example of a cascaded-modulator technique that may be used for phase and dispersion control for an optical phased array 604, various changes may be made to FIG. 9. For example, the layout and arrangement of the components in FIG. 9 can vary, such as depending on where the modulators 902 and 904 are positioned.

Note that while the architectures 600 and 800 are illustrated separately in the figures, a single architecture may be implemented that supports the functionality of both architectures 600 and 800. For example, the architecture 800 may be modified to include the electro-optic modulators 612 in the arms of the source laser 602. The measurements from the photodetectors 640 may then be used to control both the electro-optic modulators 612 and the dispersive compensation elements 812. This may allow the same architecture to support both temporal squint correction and frequency dispersion squint correction. Thus, for instance, the combination of the modulators 902 and/or 904 and the electro-optic modulators 612 may allow for control of the phase, dispersion, and timing of the transmissions by each supercell 626. Also note that while the temporal and frequency squint corrections are described above as being supported using components in the arms of the source laser 602, the arms may be positioned elsewhere (such as in the receiver 606).

As described above, various modulators (such as the modulators 508 and modulators implementing the dispersive compensation elements 812) may be implemented in various ways. In some embodiments, optical phase shifts may be provided using a modulator by (i) changing the index of refraction of a waveguide carrying an optical signal or (ii) changing the charge carrier density of a waveguide carrying an optical signal. The first approach may be achieved using thermal resonators, and the second approach may be achieved using PN junction micro-ring modulators. One possible advantage of PN junction micro-ring modulators over thermal resonators is power consumption, since PN junction micro-ring modulators may consume very small amounts of power (such as less than 10 μW each).

Figure 10:
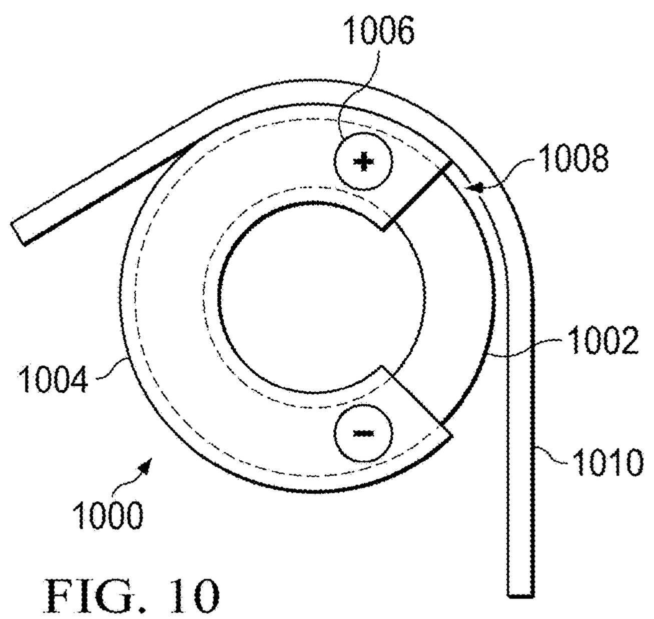
FIGS. 10 and 11 illustrate example modulators in a photonic integrated circuit according to this disclosure.
Figure 11:
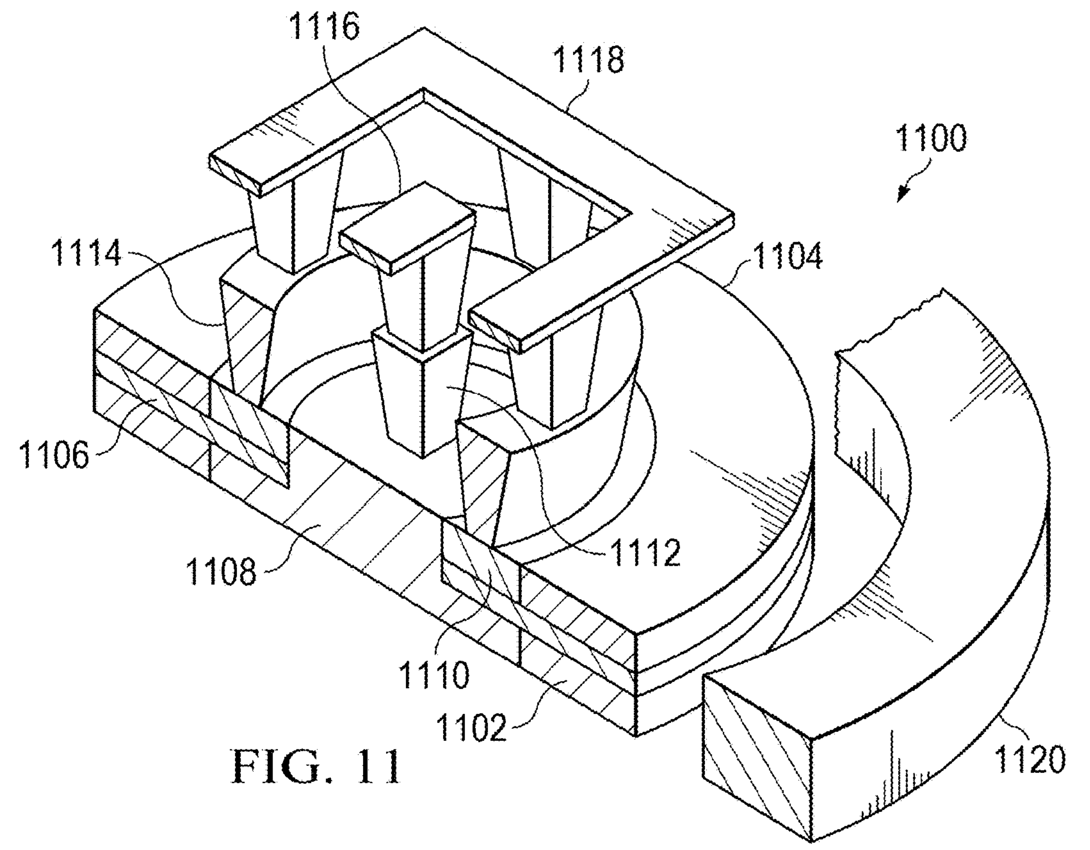

FIGS. 10 and 11 illustrate example modulators 1000 and 1100 in a photonic integrated circuit 402 according to this disclosure. As shown in FIG. 10, the modulator 1000 here represents a thermal resonator that is implemented using a micro-ring resonator 1002 and a heater 1004 positioned above or otherwise near the micro-ring resonator 1002. The micro-ring resonator 1002 resonates based on an optical signal flowing through an associated signal pathway 1010. Varying the temperature of the micro-ring resonator 1002 alters the resonance wavelength of the micro-ring resonator 1002, thereby changing the phase of the optical signal flowing through the signal pathway 1010. Voltages can be applied to two electrical contacts 1006 of the heater 1004 in order to create the desired temperature change and therefore implement the desired phase shift of the optical signal flowing through the signal pathway 1010. The voltages applied to the electrical contacts 1006 of the heater 1004 can represent the output voltages from the amplifiers 516 and 518. When the modulator 1000 is used in a unit cell 502, different voltages applied to the heater 1004 by the corresponding DRIIC cell 512 can cause different phase shifts to occur in the modulator 1000.

The micro-ring resonator 1002 may be formed from any suitable material(s), such as silicon, and in any suitable manner. The heater 1004 may be formed from any suitable material(s), such as one or more metals, and in any suitable manner. The micro-ring resonator 1002 may be separated from the heater 1004 by any suitable material(s), such as silicon dioxide. The micro-ring resonator 1002 and heater 1004 may each have any suitable size, shape, and dimensions. In some embodiments, the micro-ring resonator 1002 is annular and has a diameter of about 5.5 μm, and the heater 1004 is crescent-shaped and has a diameter of about 5.5 μm. However, other shapes and sizes may be used here. The electrical contacts 1006 of the heater 1004 here can be coupled to the outputs of the corresponding DRIIC cell 512 or another component in any suitable manner, such as via flip-chip bonding. A gap 1008 between the micro-ring resonator 1002 and the signal pathway 1010 may have any suitable value, such as about 150 nm to about 210 nm (±10 nm). In some cases, design parameters like the thickness of the micro-ring resonator 1002 or the size of the gap 1008 can be altered in order to provide desired functionality for the phase modulator 1000.

As shown in FIG. 11, the modulator 1100 here represents a PN junction micro-ring modulator that is implemented using various regions of semiconductor material, such as doped and undoped silicon. In this example, the modulator 1100 is shown in cross-section for explanation. Here, the modulator 1100 includes a first annular semiconductor region 1102 separated from a second annular semiconductor region 1104. The annular semiconductor regions 1102 and 1104 can represent different types of semiconductor material, such as when the annular semiconductor region 1102 represents an N-type semiconductor material and the annular semiconductor region 1104 represents a P-type semiconductor material. A semiconductor region 1106 (such as undoped silicon) can separate the regions 1102-1104. A doped semiconductor region 1108 is positioned within the annular regions 1102-1104, and a doped semiconductor region 1110 is positioned around an upper portion of the doped semiconductor region 1108. The doped semiconductor regions 1108 and 1110 can represent different regions of semiconductor material with different dopants, such as when the doped semiconductor region 1108 is doped with an N+ dopant and the doped semiconductor region 1110 is doped with a P+ dopant. An electrical contact 1112 can be used to form an electrical connection with the doped semiconductor region 1108, and an electrical contact 1114 can be used to form an electrical connection with the doped semiconductor region 1110. An electrical connection 1116 can be used to provide a voltage to the electrical contact 1112, and an electrical connection 1118 can be used to provide a voltage to the electrical contact 1114.

Here, the various semiconductor regions 1102-1110 form a PN junction micro-ring modulator, and the electrical contacts 1112, 1114 and electrical connections 1116, 1118 allow voltages to be applied that alter the charge carrier density of the PN junction micro-ring modulator. This alters the phase of an optical signal flowing through the associated signal pathway 1120. When the modulator 1100 is used in a unit cell 502, the electrical connections 1116, 1118 here can be coupled to the outputs of the corresponding DRIIC cell 512 in any suitable manner, such as via flip-chip bonding. Voltages applied to the electrical connections 1116, 1118 can provide the desired voltage difference and therefore implement the desired phase shift of the optical signal flowing through the signal pathway 1120. The voltages applied to the electrical connections 1116, 1118 can represent the output voltages from the amplifiers 516 and 518. As noted above, different voltages applied to the electrical connections 1116, 1118 by the corresponding DRIIC cell 512 or another component can cause different phase shifts to occur in the modulator 1100.

Although FIGS. 10 and 11 illustrate examples of modulators 1000 and 1100 in a photonic integrated circuit 402, various changes may be made to FIGS. 10 and 11. For example, the actual structure of a thermal resonator or PN junction micro-ring modulator can vary as needed or desired. Also, any other suitable structure may be used to modulate an optical signal in the photonic integrated circuit 402.

The following describes example embodiments of this disclosure that implement or relate to photonic integrated circuit temporal and frequency dispersion squint correction for an optical phased array. However, other embodiments may be used in accordance with the teachings of this disclosure.

In a first embodiment, an apparatus includes a photonic integrated circuit. The photonic integrated circuit includes an optical phased array having multiple unit cells, where each unit cell includes an antenna element configured to transmit or receive optical signals. The photonic integrated circuit also includes multiple arms configured to modify the optical signals transmitted or received by the optical phased array, where each arm is controllable to provide at least one of temporal squint correction and frequency dispersion squint correction.

In a second embodiment, a method includes transmitting or receiving optical signals using a photonic integrated circuit. The photonic integrated circuit includes an optical phased array. The optical phased array includes multiple unit cells, and each unit cell includes an antenna element that transmits or receives optical signals. The method also includes controlling multiple anus of the photonic integrated circuit to modify the optical signals transmitted or received by the optical phased array. Each arm is controllable to provide at least one of temporal squint correction and frequency dispersion squint correction.

In a third embodiment, an apparatus includes a photonic integrated circuit. The photonic integrated circuit includes an optical phased array having multiple unit cells, where each unit cell includes means for transmitting or receiving optical signals. The photonic integrated circuit also includes means for modifying the optical signals transmitted or received by the optical phased array to provide at least one of temporal squint correction and frequency dispersion squint correction.

Any single one or any suitable combination of the following features may be used with the first, second, or third embodiment. The photonic integrated circuit may include semiconductor optical amplifiers configured to amplify the optical signals transmitted or received by the optical phased array, and the multiple arms of the photonic integrated circuit may include the semiconductor optical amplifiers. The photonic integrated circuit may include electro-optic modulators optically coupled to the semiconductor optical amplifiers, the multiple arms of the photonic integrated circuit may include the electro-optic modulators, and the electro-optic modulators may be configured to provide controllable delays to the optical signals transmitted or received by the optical phased array. The controllable delays of the electro-optic modulators may be associated with corresponding delays in supercells of the photonic integrated circuit, where each supercell includes a subset of the unit cells. The photonic integrated circuit may include dispersive compensation elements optically coupled to the semiconductor optical amplifiers, the multiple arms of the photonic integrated circuit may include the dispersive compensation elements, and the dispersive compensation elements may be configured to use controllable phase-frequency relationships to adjust the optical signals transmitted or received by the optical phased array in order to provide frequency dispersion squint correction. The controllable phase-frequency relationships of the dispersive compensation elements may be associated with corresponding phase-frequency relationships in supercells of the photonic integrated circuit, where each supercell includes a subset of the unit cells. Each unit cell may include a phase modulator configured to modify a phase of the optical signals being transported through a signal pathway of the unit cell. The photonic integrated circuit may include a cascaded arrangement of modulators, the cascaded arrangement of modulators may include multiple modulators having different response characteristics, and the cascaded arrangement of modulators may be configured to provide controllable phase and dispersion control to the optical signals. Each arm of the photonic integrated circuit may be controllable to provide step-wise compensation of temporal squint and step-wise compensation of frequency dispersion squint. The arms of the photonic integrated circuit may be phase-locked with respect to one another.

In some embodiments, various functions described in this patent document are implemented or supported by a computer program that is formed from computer readable program code and that is embodied in a computer readable medium. The phrase “computer readable program code”

includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:

a photonic integrated circuit comprising:

an optical phased array comprising multiple unit cells, each unit cell comprising:

an antenna element configured to transmit optical signals through free space or receive optical signals through free space; and a cascaded arrangement of modulators, the cascaded arrangement of modulators including multiple modulators having different response characteristics, the cascaded arrangement of modulators configured to provide controllable phase and dispersion control to the optical signals;

a digital read in integrated circuit (DRIIC) layer comprising multiple DRIIC cells, each DRIIC cell comprising:

a demultiplexer configured to select a value associated with a stream of array phase shifts received by the demultiplexer;

a register configured to receive an indication of the value selected by the demultiplexer and output the value; and a first amplifier and a second amplifier configured to receive the value from the register and, based on the value, control at least one modulator of the cascaded arrangement of modulators of a respective unit cell of the optical phased array; and multiple arms configured to modify the optical signals transmitted or received by the optical phased array, wherein each arm is controllable to provide step-wise compensation of temporal squint and step-wise compensation of frequency dispersion squint, and wherein each arm comprises a photodetector configured to output a sample of an optical signal associated with that arm, the samples used to phase-lock the arms with respect to one another.

2. The apparatus of claim 1, wherein the photonic integrated circuit further comprises semiconductor optical amplifiers configured to amplify the optical signals transmitted or received by the optical phased array, the multiple arms of the photonic integrated circuit including the semiconductor optical amplifiers.

3. The apparatus of claim 2, wherein:

the photonic integrated circuit further comprises electro-optic modulators optically coupled to the semiconductor optical amplifiers, the multiple arms of the photonic integrated circuit further including the electro-optic modulators; and the electro-optic modulators are configured to provide controllable delays to the optical signals transmitted or received by the optical phased array.

4. The apparatus of claim 3, wherein the controllable delays of the electro-optic modulators are associated with corresponding delays in supercells of the photonic integrated circuit, each supercell comprising a subset of the unit cells.

5. The apparatus of claim 2, wherein:

the photonic integrated circuit further comprises dispersive compensation elements optically coupled to the semiconductor optical amplifiers, the multiple arms of the photonic integrated circuit further including the dispersive compensation elements; and the dispersive compensation elements are configured to use controllable phase-frequency relationships to adjust the optical signals transmitted or received by the optical phased array in order to provide frequency dispersion squint correction.

6. The apparatus of claim 5, wherein the controllable phase-frequency relationships of the dispersive compensation elements are associated with corresponding phase-frequency relationships in supercells of the photonic integrated circuit, each supercell comprising a subset of the unit cells.

7. The apparatus of claim 1, wherein each unit cell further comprises a phase modulator configured to modify a phase of the optical signals being transported through a signal pathway of the unit cell.

8. The apparatus of claim 1, wherein one or more of the multiple modulators is a silicon-based resonant micro-ring modulator between about five microns and about six microns in diameter.

9. The apparatus of claim 1, wherein the value corresponds with output voltages to be provided by the first amplifier and the second amplifier to the at least one modulator.

10. A method comprising:

transmitting optical signals through free space or receiving optical signals through free space using a photonic integrated circuit comprising a digital read in integrated circuit (DRIIC) layer and an optical phased array, the optical phased array comprising multiple unit cells, each unit cell comprising:

an antenna element that transmits or receives optical signals; and a cascaded arrangement of modulators, the cascaded arrangement of modulators including multiple modulators having different response characteristics, the cascaded arrangement of modulators configured to be controlled by a DRIIC cell of the DRIIC layer to provide controllable phase and dispersion control to the optical signals wherein the DRIIC cell comprises:

a demultiplexer that selects a value associated with a stream of array phase shifts received by the demultiplexer;

a register that receives an indication of the value selected by the demultiplexer and outputs the value; and a first amplifier and a second amplifier that receive the value from the register and, based on the value, control at least one modulator of the cascaded arrangement of modulators of the unit cell;

controlling multiple arms of the photonic integrated circuit to modify the optical signals transmitted or received by the optical phased array, wherein each arm is controllable to provide step-wise compensation of temporal squint and step-wise compensation of frequency dispersion squint; and phase-locking the arms with respect to each other using samples of the optical signals provided by photodetectors in the arms.

11. The method of claim 10, wherein the photonic integrated circuit further comprises semiconductor optical amplifiers that amplify the optical signals transmitted or received by the optical phased array, the multiple arms of the photonic integrated circuit including the semiconductor optical amplifiers.

12. The method of claim 11, wherein:

the photonic integrated circuit further comprises electro-optic modulators optically coupled to the semiconductor optical amplifiers, the multiple arms of the photonic integrated circuit further including the electro-optic modulators; and the electro-optic modulators provide controllable delays to the optical signals transmitted or received by the optical phased array.

13. The method of claim 12, wherein the controllable delays of the electro-optic modulators are associated with corresponding delays in supercells of the photonic integrated circuit, each supercell comprising a subset of the unit cells.

14. The method of claim 11, wherein:

the photonic integrated circuit further comprises dispersive compensation elements optically coupled to the semiconductor optical amplifiers, the multiple arms of the photonic integrated circuit further including the dispersive compensation elements; and the dispersive compensation elements use controllable phase-frequency relationships to adjust the optical signals transmitted or received by the optical phased array in order to provide frequency dispersion squint correction.

15. The method of claim 14, wherein the controllable phase-frequency relationships of the dispersive compensation elements are associated with corresponding phase-frequency relationships in supercells of the photonic integrated circuit, each supercell comprising a subset of the unit cells.

16. An apparatus comprising:

a photonic integrated circuit comprising:

a digital read in integrated circuit (DRIIC) layer; and an optical phased array comprising multiple unit cells, each unit cell comprising:

means for transmitting optical signals through free space or receiving optical signals through free space; and means for providing controllable phase and dispersion control to the optical signals, the means controlled by a respective DRIIC cell of the DRIIC layer;

means for modifying the optical signals transmitted or received by the optical phased array to provide step-wise compensation of temporal squint and step-wise compensation of frequency dispersion squint; and means for outputting samples of the optical signals, the samples used to phase-lock the optical signals with respect to one another, wherein each of the DRIIC cells comprises:

a demultiplexer configured to select a value associated with a stream of array phase shifts received by the demultiplexer;

a register configured to receive an indication of the value selected by the demultiplexer and output the value; and a first amplifier and a second amplifier configured to receive the value from the register and, based on the value, control the means for providing controllable phase and dispersion control to the optical signals.

17. The apparatus of claim 16, wherein the photonic integrated circuit further comprises means for amplifying the optical signals transmitted or received by the optical phased array.

18. The apparatus of claim 17, wherein the photonic integrated circuit further comprises means for providing controllable delays to the optical signals transmitted or received by the optical phased array.

19. The apparatus of claim 17, wherein the photonic integrated circuit further comprises means for providing dispersive compensation to the optical signals transmitted or received by the optical phased array.

20. The apparatus of claim 16, wherein each unit cell further comprises means for modifying a phase of the optical signals being transported through a signal pathway of the unit cell.

* * * * *